United States Patent
Ishiguro et al.

(10) Patent No.: US 7,634,547 B2
(45) Date of Patent: Dec. 15, 2009

(54) COMMUNICATION NETWORK SYSTEM, AND ID ALLOCATING METHOD AND ID SETTING METHOD FOR COMMUNICATION NETWORK SYSTEM

(75) Inventors: Yukari Ishiguro, Hoi-gun (JP); Hideaki Ishihara, Okazaki (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 819 days.

(21) Appl. No.: 11/004,971

(22) Filed: Dec. 7, 2004

(65) Prior Publication Data
US 2005/0152388 A1    Jul. 14, 2005

(30) Foreign Application Priority Data
Jan. 13, 2004    (JP) ............................. 2004-005392
Mar. 30, 2004    (JP) ............................. 2004-099472

(51) Int. Cl.
*G06F 15/16*    (2006.01)
*G06F 15/177*    (2006.01)
(52) U.S. Cl. ....................... 709/208; 709/222
(58) Field of Classification Search .............. 709/203, 709/208, 209, 220, 222, 229; 707/203, 204, 707/200, 100; 370/457, 475, 254, 449; 340/825.52, 340/825.07, 825.08, 5.3, 5.61, 5.72, 5.62
See application file for complete search history.

(56) References Cited

U.S. PATENT DOCUMENTS 5,768,277 A * 6/1998 Ohno et al. .................. 370/457
6,920,469 B2 * 7/2005 Cooke et al. ................. 707/203
7,031,829 B2 * 4/2006 Nisiyama ..................... 701/209
7,190,253 B2 * 3/2007 Shimomura ................. 340/5.3

FOREIGN PATENT DOCUMENTS

| | | |
|---|---|---|
| JP | A-4-211890 | 8/1992 |
| JP | A-08-130418 | 5/1996 |
| JP | A-10-122634 | 5/1998 |
| JP | A-2000-15138 | 5/2000 |
| JP | A-2000-208933 | 7/2000 |
| JP | A-2000-276258 | 10/2000 |

OTHER PUBLICATIONS

Office Action dated Jan. 20, 2009 in corresponding Japanese patent application No. 2004-099472 (and English translation).
Office Action dated Nov. 11, 2008 in corresponding Japanese patent application No. 2004-099472 (and English translation).

* cited by examiner

*Primary Examiner*—Hanh Nguyen
(74) *Attorney, Agent, or Firm*—Posz Law Group, PLC

(57) ABSTRACT

When each slave ECU is powered on and activated while connected to a communication network through a harness, it reads out divided voltage potential applied by voltage dividing resistors in each ID determining signal line, and allows reception of a data packet transmitted from control ECU when a wait time corresponding to the divided voltage potential elapses. The control ECU successively transmits a data packet containing as a main body ID data to be allocated to each slave ECU, and each slave ECU sets ID data transmitted as its own ID.

15 Claims, 23 Drawing Sheets

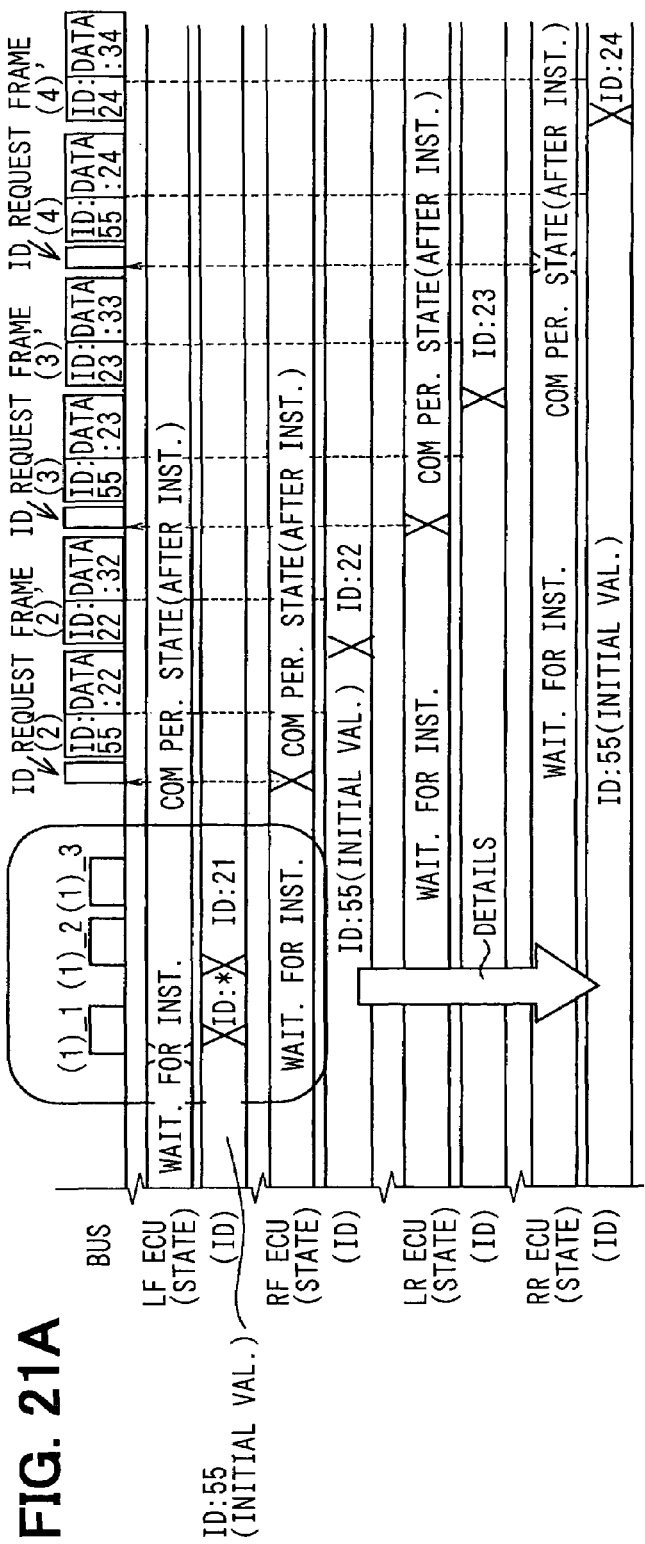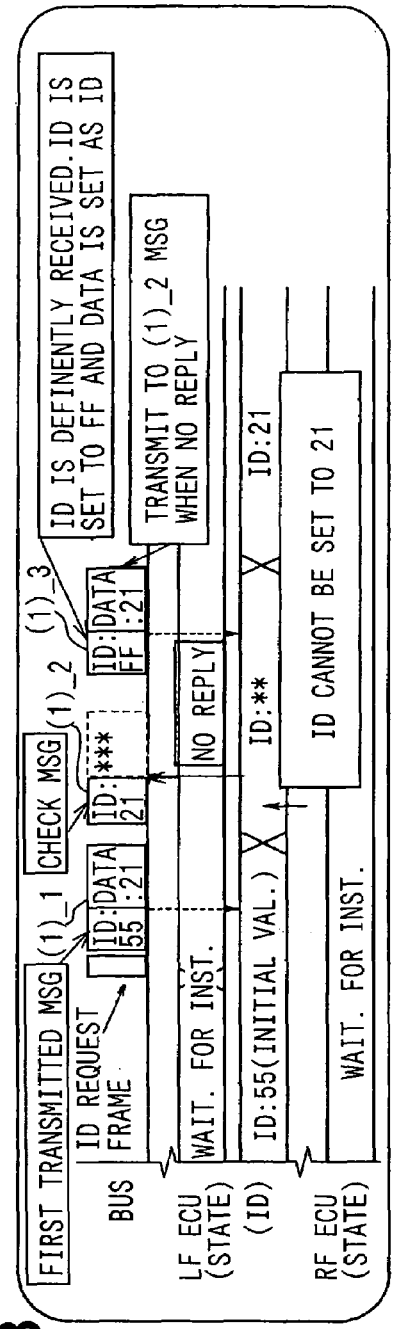
FIG. 21A
FIG. 21B

COMMUNICATION NETWORK SYSTEM, AND ID ALLOCATING METHOD AND ID SETTING METHOD FOR COMMUNICATION NETWORK SYSTEM

CROSS REFERENCE TO RELATED APPLICATIONS

This application is based upon, claims the benefit of priority of, and incorporates by reference the contents of, Japanese Patent Application No. 2004-5392 filed on Jan. 13, 2004 and Japanese Patent Application No. 2004-99472 filed on Mar. 30, 2004.

FIELD OF THE INVENTION

The present invention relates to a communication network system comprising one master connected to the communication network and two or more slaves, and ID allocating method and ID setting method for the communication network system.

BACKGROUND OF THE INVENTION

A conventional ECU network system includes an ECU mounted in each part of a vehicle and connected through a communication network such as an in-vehicle LAN or the like. Inherent IDs are allocated to respective ECUs even when these ECUs have the same function from the viewpoint of necessity on communication managements. FIG. 25 shows the construction of such a related art ECU network system. In this ECU network system, a control ECU 1 serving as a master for communication processing and plural ECUs 2A, 2B, 2C, 2D serving as slaves are connected to a communication network 3 such as an in-vehicle LAN or the like through wire harnesses 4A, 4B, 4C, 4D.

The four slaves ECUs 2A to 2D are arranged in the doors of the vehicle, and monitor the open/close state of the doors and the lock/unlock state of the doors. These slave ECUs correspond to the four doors at the left front side (shown as LF), the right front side (shown as RF), the left rear (left rear seat shown as LR) and the right rear (right rear seat shown as RR). For example, different IDs such as a left front ID "ECU_1", a right front ID "ECU_2", a left rear ID "ECU_3" and a right rear ID "ECU_4" are allocated to the respective slaves ECUs 2A to 2D in accordance with the position of each door.

Patent Document 1 (JP-A-2000-151538) discloses an example of such a communication network system. This system discloses multiplexing plural real-time data output from one signal source and transmitting/receiving the data by one node. Therefore, this disclosed approach has no direct relation to the background technique of the present invention.

However, advance allocation of different IDs to the four slaves ECUs 2A to 2D connected to the same network means that when parts are managed, these parts are managed while different part numbers are also allocated to the same type of ECUs, and thus the management is cumbersome.

A manner of dynamically setting IDs on the network may be considered as a means of avoiding the presetting of different IDs to the plural slaves ECUs 2A to 2D. For example, an approach is known in which a dedicated terminal is provided for identifying each ECU and decoding data set by these terminals to determine ID. However, this approach has the drawback of requiring the number of necessary terminals and the number of signal lines connected to these terminals to increase as the number of ECUs connected to the network increases.

SUMMARY OF THE INVENTION

The present invention has been implemented in view of the foregoing situation, and has an object to provide a communication network system which can surely allocate different IDs on a network without increasing the number of necessary signal lines even when the number of slaves connected to the network is increased, and an ID allocating method and ID setting method for the communication network system.

In order to attain the above object, according to a communication network system of a first aspect, when each slave is activated while being connected to a communication network through a connection means thereof, the slave reads a divided voltage potential given by a voltage dividing resistor on each ID determining signal line, and allows reception of data transmitted from the master when the standby time corresponding to the divided voltage potential elapses. The master successively transmits ID data to be allocated to each slave, and each slave sets the ID data thus transmitted thereto as its own ID.

That is, the respective slaves allow data reception after different standby times elapse respectively, and thus data transmitted from the master are prevented from being simultaneously received by plural slaves. Furthermore, the master can transmit different ID data to the respective slaves so that the respective slaves can set the corresponding different ID data. Accordingly, by merely providing one ID determining signal line to the connection means of each slave, different IDs can be allocated to the respective slaves.

According to a communication network system of a second aspect, when the master detects that a slave is connected to the communication network, the master transmits ID data to be allocated to the slave concerned, and each slave sets the ID data transmitted from the master as its own ID. Accordingly, if the respective slaves are successively connected to the communication network, the ID is allocated to each slave by the master at the time point when the slave concerned is connected to the communication network. Therefore, different IDs can be surely allocated on the network without increasing the number of signal lines.

According to a communication network system of a third aspect, when connected to the communication network, each slave transmits an ID request to the master, and upon receiving the ID request, the master detects the connection of the slave to the communication network. Accordingly, the master side is not required to actively perform the connection detecting processing, and can detect the connection of each slave by merely connecting each slave to the communication network.

According to a communication network system of a fourth aspect, each slave periodically outputs an ID request when power is turned on, and stops the output of the ID request when ID data is transmitted from the master to the slave concerned. Accordingly, the transmission control of the ID request can be easily performed.

According to a communication network system of a fifth aspect, when connected to the communication network, each slave varies the potential of the communication signal line thereof from an initial state to an intermediate level. At this time, the master recognizes variation of the potential of the communication signal line and detects the connection of the slave concerned. Each slave returns the potential of the communication signal line to the initial state at the stage that the communication processing of settling the ID data transmitted from the master as its own ID is finished. Accordingly, as in the case of the second aspect, different IDs can be surely allocated on the network without increasing the number of signal lines.

According to a communication network system of a sixth embodiment, each slave varies the potential of the communication signal line thereof to an intermediate level which is different among the slaves, and the master reads the potential variation level and transmit the ID data corresponding to each intermediate potential to each slave. In this case, when an ID to be allocated to each slave is predetermined, the master can individually identify each slave and allocate an ID to each slave.

According to a communication network system of a seventh aspect, each slave varies the potential of the communication signal line thereof to an intermediate level which is different among the respective slaves, and the master reads the potential variation level to judge whether the connection order of the slaves is proper or not. In this case, when it is required to associate the connection order of the respective slaves with ID to be allocated, the master can allocate IDs while checking the association relationship.

According to a communication network system of an eighth aspect, when setting an inherent ID, each slave returns a reply to the master. Upon receiving the reply, the master indicates the ID allocated to each slave and re-transmits it to check whether a reply to this transmission is sent or not. Accordingly, the master can check whether a desired ID is set in each slave or not.

According to a communication network system of a ninth aspect, a common ID is fixed in the respective slaves in advance. When the master receives no reply to the re-transmission, the master indicates an ID to be originally allocated and transmits the ID together with the common ID, and each slave sets as its own ID the ID data transmitted with the common ID. That is, even when the setting of ID which is tried by the master fails for some reason, the resetting can be tried by using the common ID which is fixedly set in each slave. Therefore, reliability of the system can be enhanced.

According to a communication network system of a tenth aspect, when power is turned on, each slave sets each different potential to a specific terminal. When each slave is activated while connected to the communication network, the slave reads the potential set in the terminal thereof and sets the ID corresponding to the potential as an inherent ID. Accordingly, even when the maser side does perform ID allocating processing, each slave can set ID therein at the time point when it is activated while connected to the communication network.

BRIEF DESCRIPTION OF THE DRAWINGS

The above and other objects, features and advantages of the present invention will become more apparent from the following detailed description made with reference to the accompanying drawings. In the drawings:

FIGS. 19A-19C are diagrams showing a connection order of each slave ECU to the communication network;

FIGS. 21A-21B are diagrams showing an eighth embodiment which correspond to FIGS. 9A-9B;

DETAILED DESCRIPTION OF THE PREFERRED EMBODIMENTS

Preferred embodiments according to the present invention will be described hereunder with reference to the accompanying drawings.

First Embodiment

A first embodiment when the present invention is applied to a communication network system constructed by ECUs for a vehicle will be described with reference to FIGS. 1 to 5.

Figure 5:
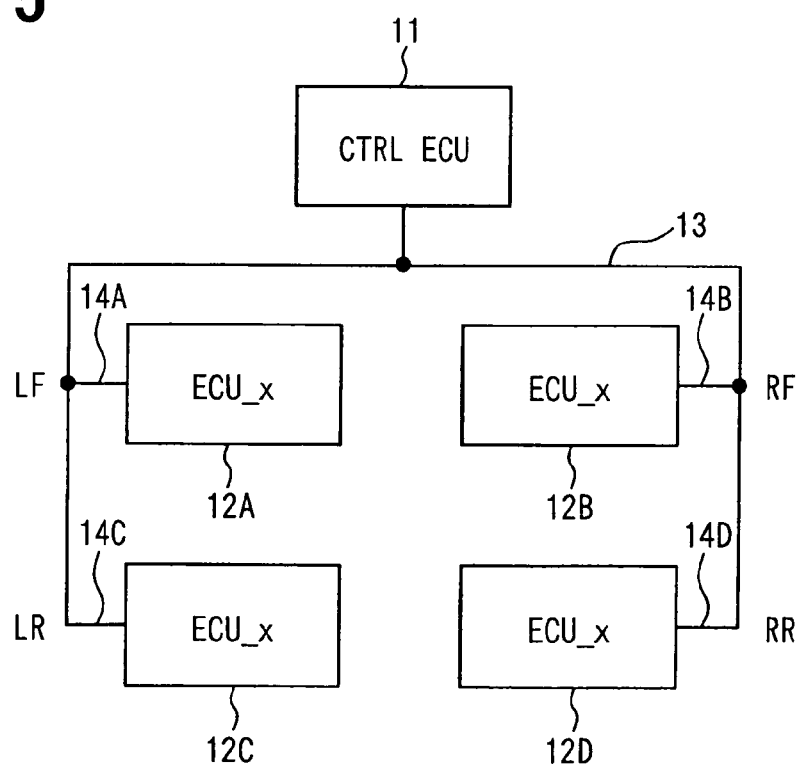
FIG. 5 is a diagram showing the construction of a communication network system of an ECU.
Figure 25:
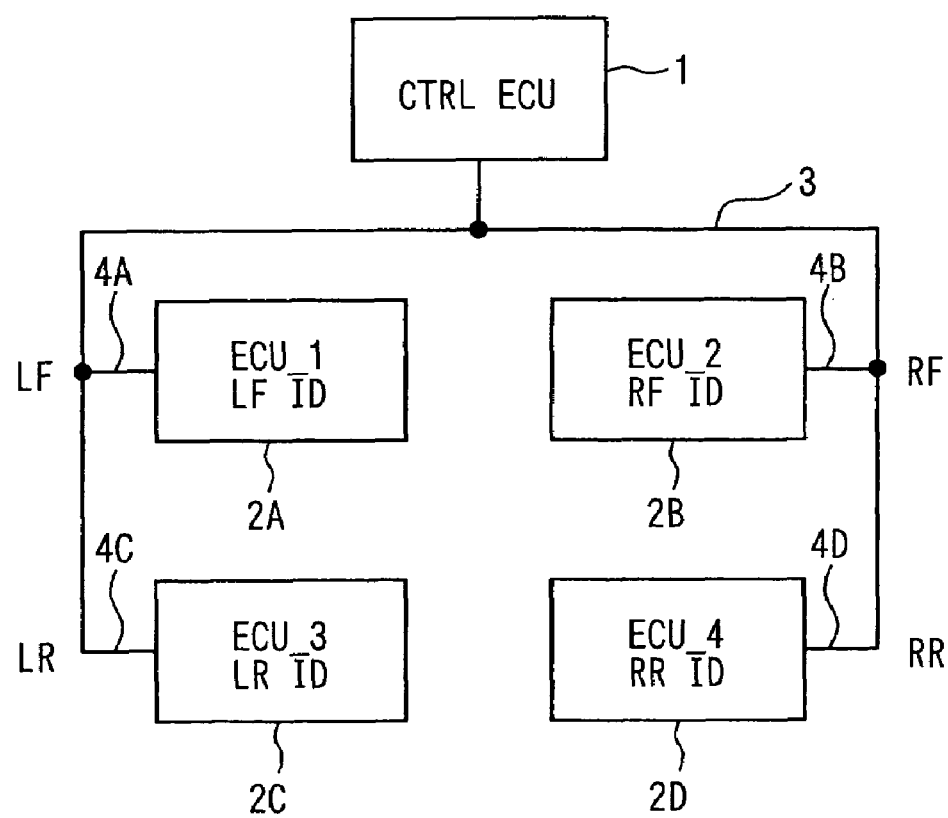
FIG. 25 is a diagram showing a related art which corresponds to FIG. 5.

FIG. 5 shows the construction of the communication network system of ECUs. Generally, the communication network system comprises a control ECU (master) 11, plural slave ECUs 12A, 12B, 12C and 12D, a communication network 13 and wire harnesses (connection means) 14A, 14B, 14C and 14D. Furthermore, the four slave ECUs 12A to 12D are arranged in the four doors of the vehicle respectively, and serve as door ECUs as in the case of the related art system construction shown in FIG. 25.

The four ECUs 12A, 12B, 12C and 12D are represented by "ECU_x". More particularly, during part management, each of the four ECUs are treated as the same part "ECU_x." Further, the IDs are allocated to the respective ECUs while they are connected to the communication network 13 as described later.

Figure 1:
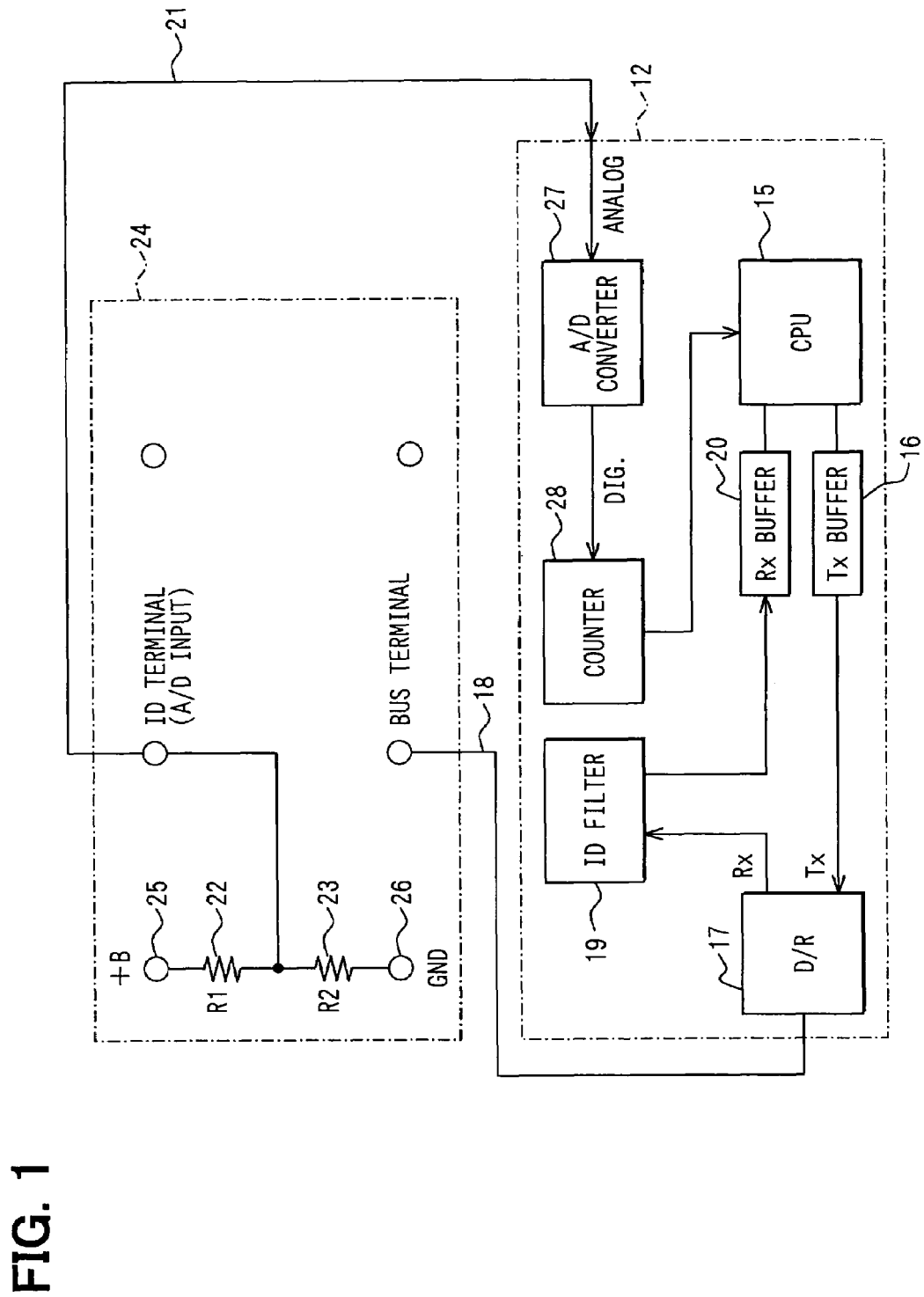
FIG. 1 is a block diagram of a first embodiment implemented within a communication network system constructed by ECUs for a vehicle, and also is a functional block diagram mainly showing the construction of a slave ECU.

FIG. 1 is a functional block diagram which mainly shows the construction of the slave ECU 12. The slave ECU 12 includes a CPU 15 for performing serial communications with the control ECU 11 through a wire harness 14 and the communication network 13 shown in FIG. 5. At the transmission time, when CPU 15 writes data into a transmission buffer (Tx buffer) 16, the data is subjected to parallel/serial conversion, and transmitted from a transmitting/receiving unit 17 serving as driver/receiver (D/R) to the control ECU 11 through the communication bus 18 of the harness 14 and the communication network 13. The data transmitted from the control ECU 11 passes through the communication network 13 and the communication bus 18 and is then written by the transmitting/receiving unit 17 through an ID filter 19 into a reception buffer (Rx buffer) 20. In the reception buffer 20, the data is subjected to serial/parallel conversion, and read in by CPU 15.

The ID filter 19 judges on the basis of ID data allocated to transmission data whether the data transmitted from the control ECU 11 is addressed to the slave ECU 12 itself. If the data is addressed to the slave ECU 12 itself, the ID filter 19 immediately transmits the reception data to a reception buffer 20. That is, the ID filter 19 comprises a shift register for receiving serial type reception data, a data register to which ID data is set by the CPU 15, and magnitude comparator for comparing both the register data, etc.

The harness 14 is equipped with an ID determining signal line 21. A divided voltage potential of (battery voltage +B) is applied to the ID determining signal line 21 by voltage dividing resistors 22 and 23. The connector (connection means) 24 is preferably disposed at the side of the slave ECU 12 where it connects to the harness 14, and the voltage dividing resistors 22 and 23 are arranged so as to be connected to each other among the connection pins of a +B power source line 25, the ID determining signal line 21 and a ground line 26.

The voltage dividing ratio based on the voltage dividing resistors 22 and 23 is set to be different among the harnesses 14A, 14B, 14C and 14D corresponding to the respective slave ECUs 12A, 12B, 12C and 12D.

An A/D converter 27 for reading the divided voltage potential and a wait time setting counter 28 in which A/D-converted data is set are arranged at the slave ECU 12 side. The counter 28 starts a down-count operation when the A/D-converted data is set, and outputs a transmission allowing signal to the CPU 15 in an interruption mode when the count value is equal to "0". These operations are automatically started with no assistance from the CPU 15 when the power of the slave ECU 12 is turned on.

Figure 2:
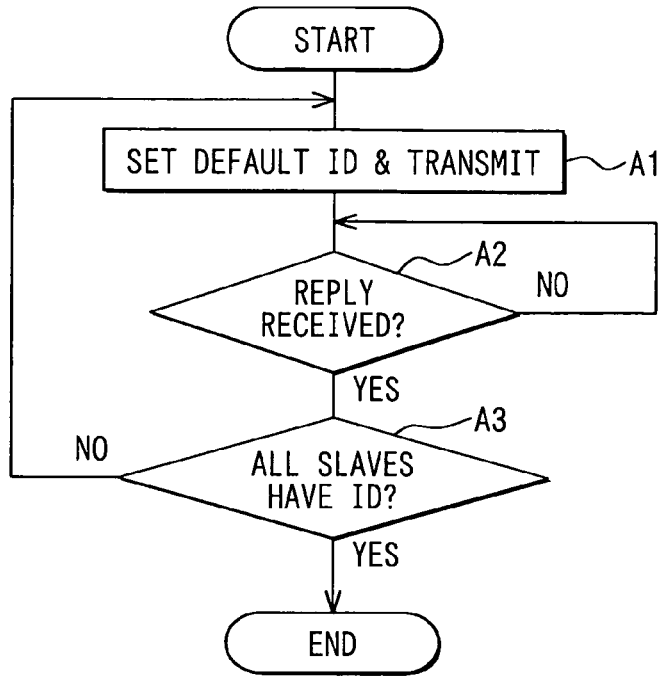
FIG. 2 is a flowchart showing the control content of the control ECU.
Figure 3:
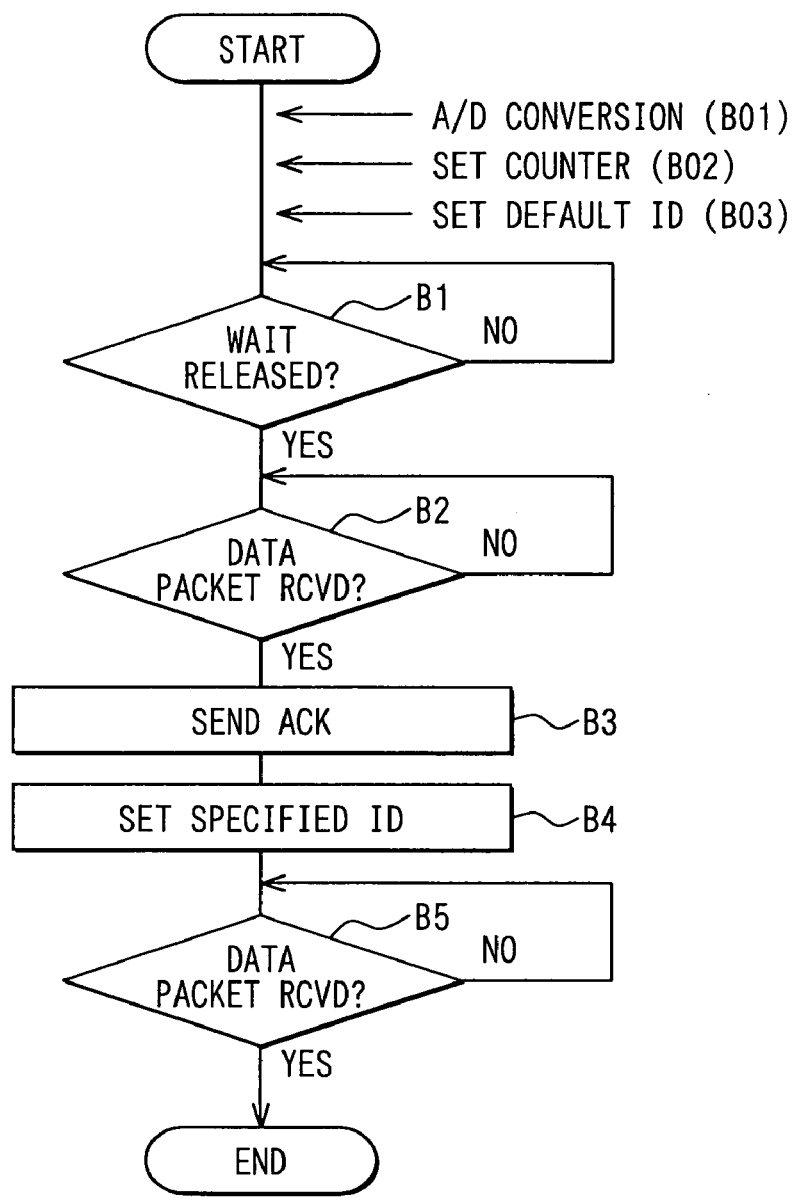
FIG. 3 is a flowchart showing the control content of slave ECU.

Next, the operation of this embodiment will be described with reference to FIGS. 2 to 4. FIGS. 2 and 3 are flowcharts showing the respective control contents of the control ECU 11 and the slave ECU 12. These processes begin when power is supplied to the control ECU 11 and the slave ECU 12 from, for example, a battery.

Referring to FIG. 2, the control ECU 11 is preset so that IDs are successively allocated to the slave ECUs 12A, 12B, 12C and 12D in this order. A default ID "55" is set to each of the ECUs 12A, 12B, 12C and 12D under initial state. The control ECU 11 sets the default ID "55" to the header of each data packet and then transmits it (step A1). The processing waits until a reception reply to the data packet thus transmitted is returned (step A2), and when the reception reply is returned ("YES"), the processing returns to the step A1 to repeat the ID allocation if the ID allocation to all the slave ECUs 12 is not finished (step A3, "NO"). After all the slave ECUs have the default ID set to the header and returned the reception reply ("YES"), subsequent stationary communication processing is performed.

Referring to FIG. 3, when power supply is started at the slave ECU 12 side, the A/D converter 27 automatically carries out the A/D conversion on the divided voltage potential applied to the ID determining signal line 21 (step B01), the A/D-converted data is set in the wait time setting counter 28 (step B02). At this time, the counter 28 starts the down-count operation. Furthermore, the default ID data "55" is automatically set to the data register in the ID filter 19 by hardware logic (step B03). As described above, the processing of steps B01 to B03 is performed with no assistance from the CPU 15.

Subsequently, CPU 15 waits until the transmission allowing signal is given in the interruption mode by the counter 28 (step B1). When the count value is set to "0" and interruption occurs ("YES"), the CPU 15 is set to a reception waiting state for data packets transmitted from the control ECU 11 (step B2). When a data packet is received ("YES"), a reception reply (acknowledge or ACK) is transmitted to the control ECU 11 (step B3), the ID data indicated by the data packet concerned are written and set in the data register of the ID filter 19 (step B4). Subsequently, the CPU 15 is set to the reception waiting state to await the data packets transmitted from the control ECU 11 as the stationary waiting state (step B5).

Figure 4:
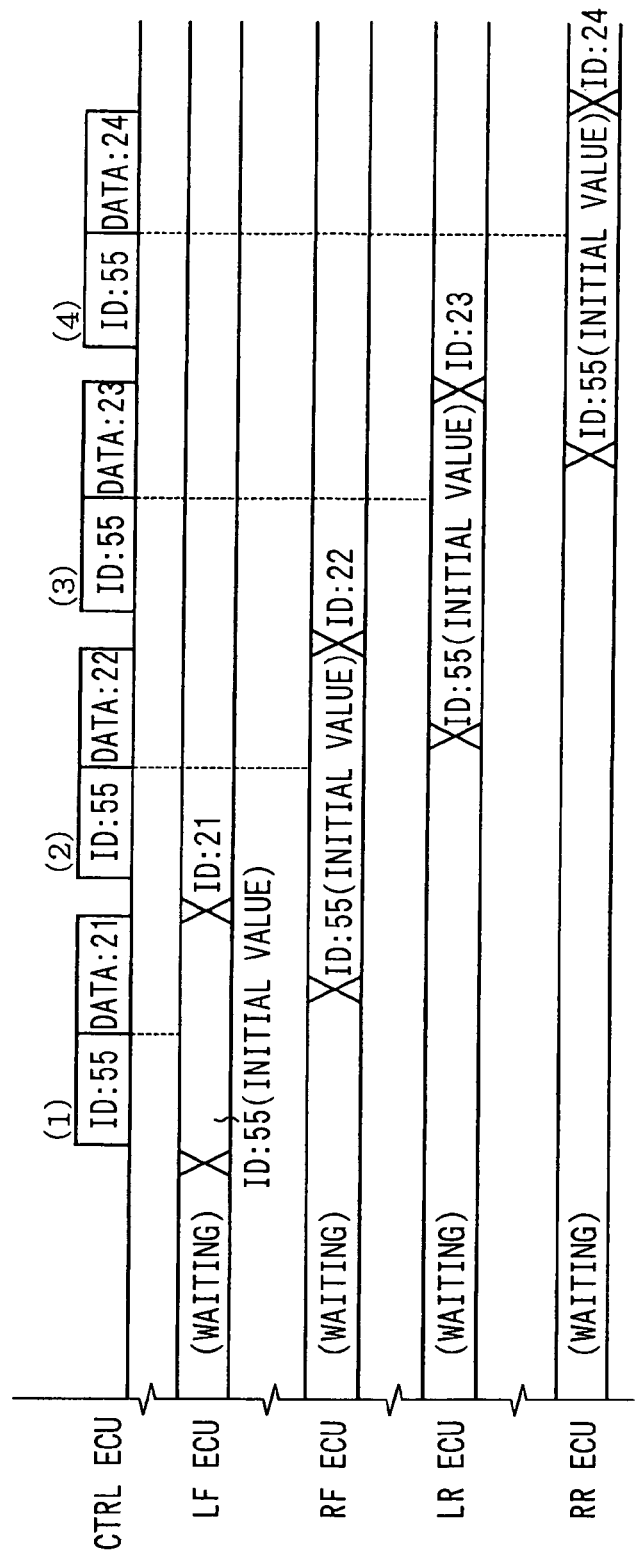
FIG. 4 is a timing chart showing an example of a communication processing sequence performed between the control ECU and four slave ECUs.

FIG. 4 shows an example of the communication processing sequence performed between the control ECU 11 and each of the four slave ECUs 12A, 12B, 12C and 12D. The control ECU 11 and each ECU 12 (A to D) are operated according to the flowcharts of FIGS. 2 and 3. The divided voltage potential of the ID determining signal line 21 corresponding to each of the harnesses 14A, 14B, 14C, 14D is gradually increased at the slave ECU 12A, 12B, 12C, 12D side. Accordingly, the wait time of the ECU 12A, 12B, 12C, 12D (the wait time in the step B1 of FIG. 3) is also gradually lengthened in accordance with the increase of the divided voltage potential.

Referring to FIG. 4, the control ECU 11 first sets ID to the slave ECU 12A, and transmits a data packet containing the default ID "55" as a header and the ID data "21" to be allocated as a main body. With respect to the left front (LF) slave ECU 12A, the waiting state thereof is first released, and the slave ECU 12A waits for a data packet from the control ECU 11 under the state that the default ID "55" is set in the ID filter 19. When the data packet (1) is transmitted by the control ECU 11, the slave ECU 12A receives the packet concerned. Then, when the slave ECU 12A transmits a reception reply to the control ECU 11, it sets the ID "21" to the ID filter 19. Illustration of the reception reply is omitted from FIG. 4.

When confirming the reception reply from the slave ECU 12A, the control ECU 11 transmits a data packet containing the default ID "55" as a header and ID data to be allocated as a main body to the next slave ECU 12B in order to set ID to the next slave ECU 12B. The waiting state of the slave ECU 12B is next released. The slave ECU 12B receives the data packet transmitted from the control ECU 11, and transmits a reception reply to the control ECU 11 as in the case of the ECU 12A. At this time, the slave ECU 12B sets ID "22" to the ID filter 19. Subsequently, the slave ECUs 12C, 12D set IDs "23" and "24" transmitted from the control ECU 11 to the respective ID filters 19.

As described above, according to this embodiment, when the power of each slave ECUs 12 (A to D) is turned on and activated under the state that the respective slave ECUs are connected to the communication network 13 through the respective harnesses 14 (A to D), the divided voltage potential achieved by the voltage dividing resistors 22, 23 on each ID determining signal line 21 is read in by the A/D converter 27. When the wait time corresponding to the divided voltage potential elapses in the counter 28, reception of data packets transmitted from the control ECU 11 is allowed. The control ECU 11 successively transmit data packets each containing as the main body the ID data to be allocated to each slave ECU 12, and each slave ECU 12 sets the ID data thus transmitted as its own ID.

Accordingly, the data packets transmitted from the control ECU 11 are prevented from being simultaneously received by plural slave ECUs 12, and the control ECU 11 can transmit different ID data to the respective slave ECUs 12 to set the ID data to the respective slave ECUs. Accordingly, it is possible to allocate different IDs to the respective slave ECUs 12 by merely providing one ID determining signal line 21 to the harness 14 of each slave ECU 12.

Second Embodiment

Figure 6:
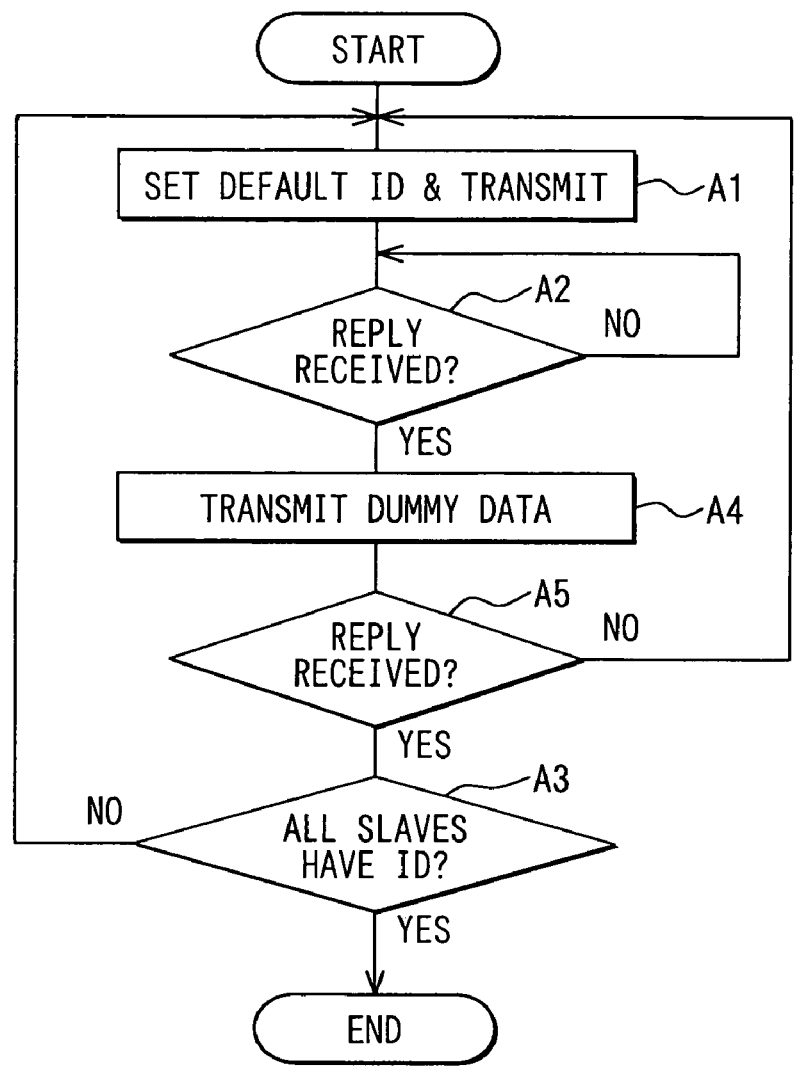
FIG. 6 is a flow diagram showing a second embodiment which corresponds to FIG. 2.
Figure 7:
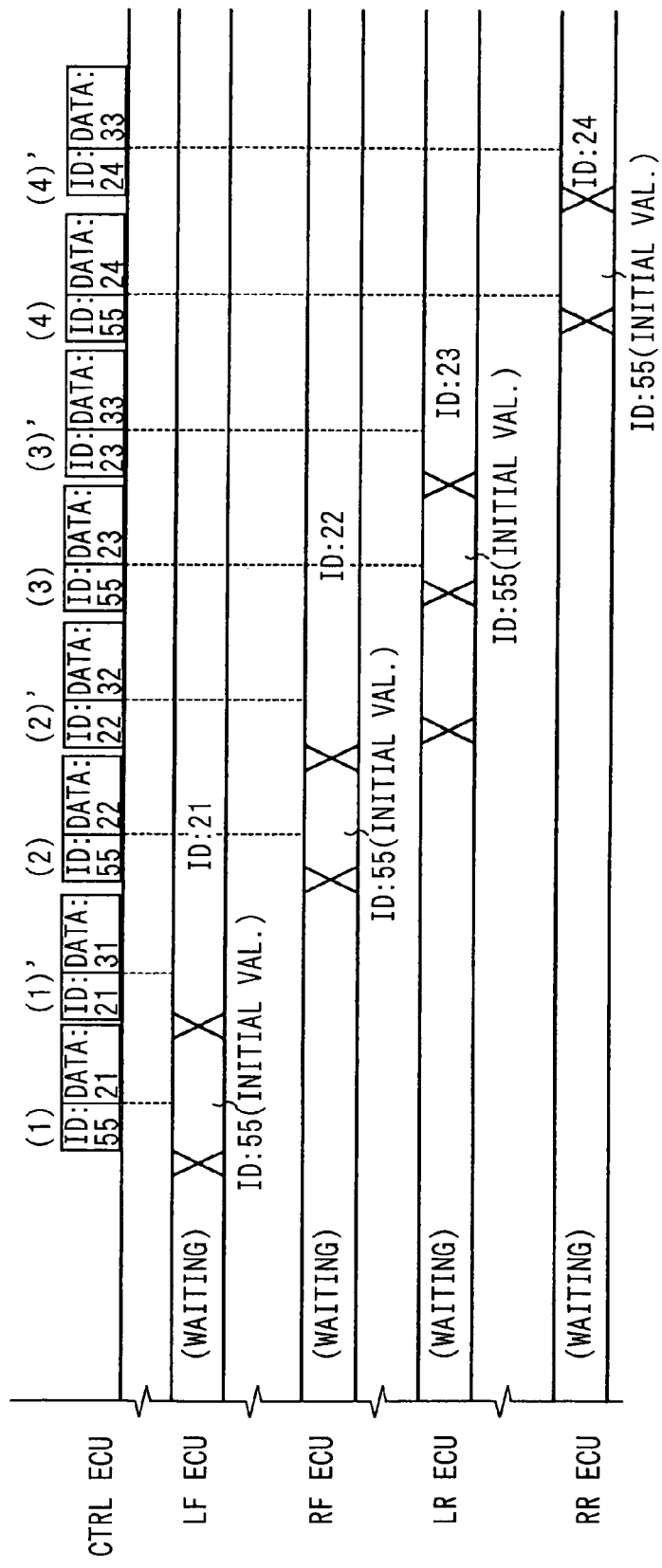
FIG. 7 is a diagram showing the second embodiment which corresponds to FIG. 4.

FIGS. 6 and 7 show a second embodiment. The same elements as the first embodiment are represented by the same reference numerals, and the description thereof is omitted. Only different parts will be described.

In the second embodiment, when there is a reception reply from the slave ECU 12 in step A2 ("YES"), the control ECU 11 transmits dummy data "31" with the ID allocated in step A1 as a header at step A4 as shown in FIG. 7. If a reception reply to the transmission concerned is returned (step A5, "YES"), the control ECU 11 shifts to the step A3. On the other hand, if no reception reply is returned within a predetermined time (step A5, "NO"), the control ECU 11 returns to step A1 to perform the ID setting processing again.

That is, if the ID allocated to the slave ECU 12 is surely set in step A1, a reception reply to the transmission of the corresponding packet would be returned, so that the control ECU 11 can confirm that the ID is set in step A5.

As described above, according to the second embodiment, each slave ECU 12 sets the ID data transmitted thereto as its own ID, and returns a reply to the control ECU 11. When receiving the reply from the slave ECU 12, the control ECU 11 indicates the IDs allocated to the respective slave ECUs, re-transmits them again, and confirms whether a reply to the transmission is returned or not. Accordingly, the control ECU 11 can confirm whether a desired ID is set to each slave ECU 12.

Third Embodiment

Figure 8:
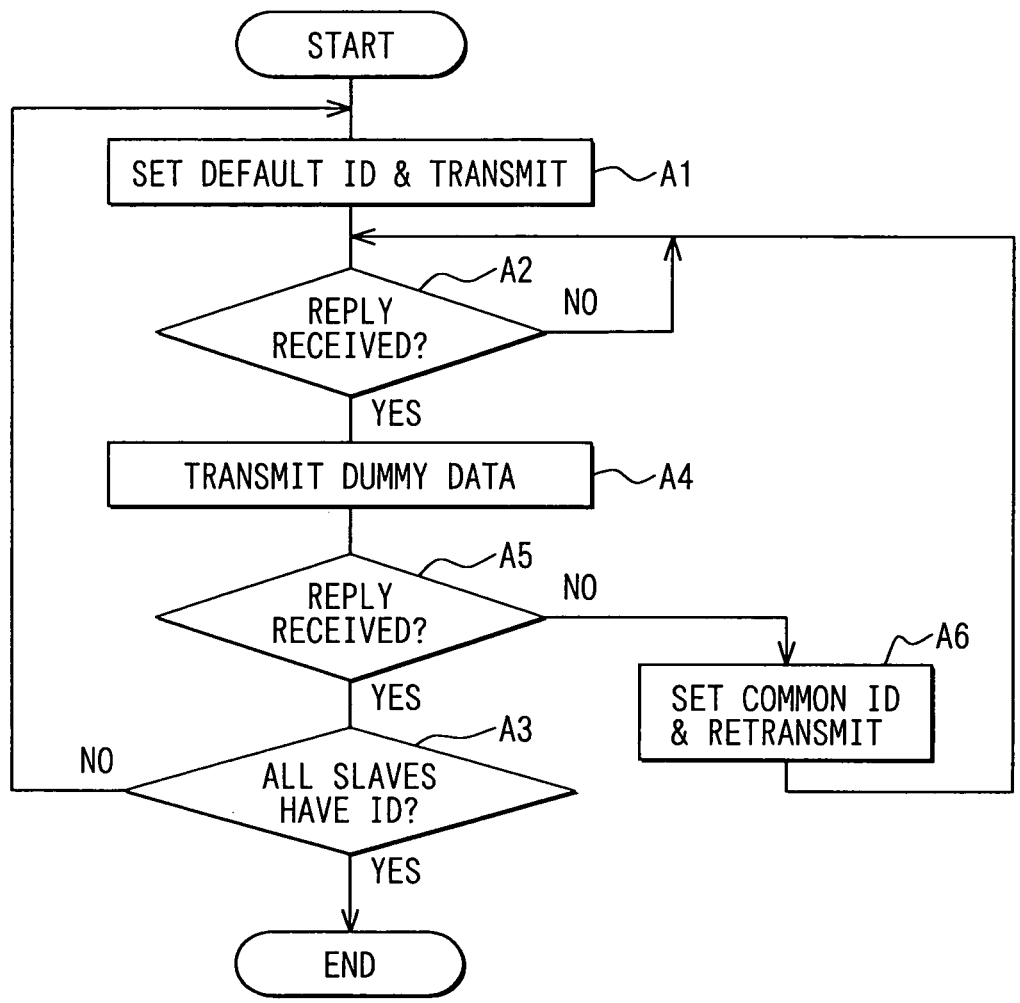
FIG. 8 is a diagram showing a third embodiment which corresponds to FIG. 2.
Figure 9A:
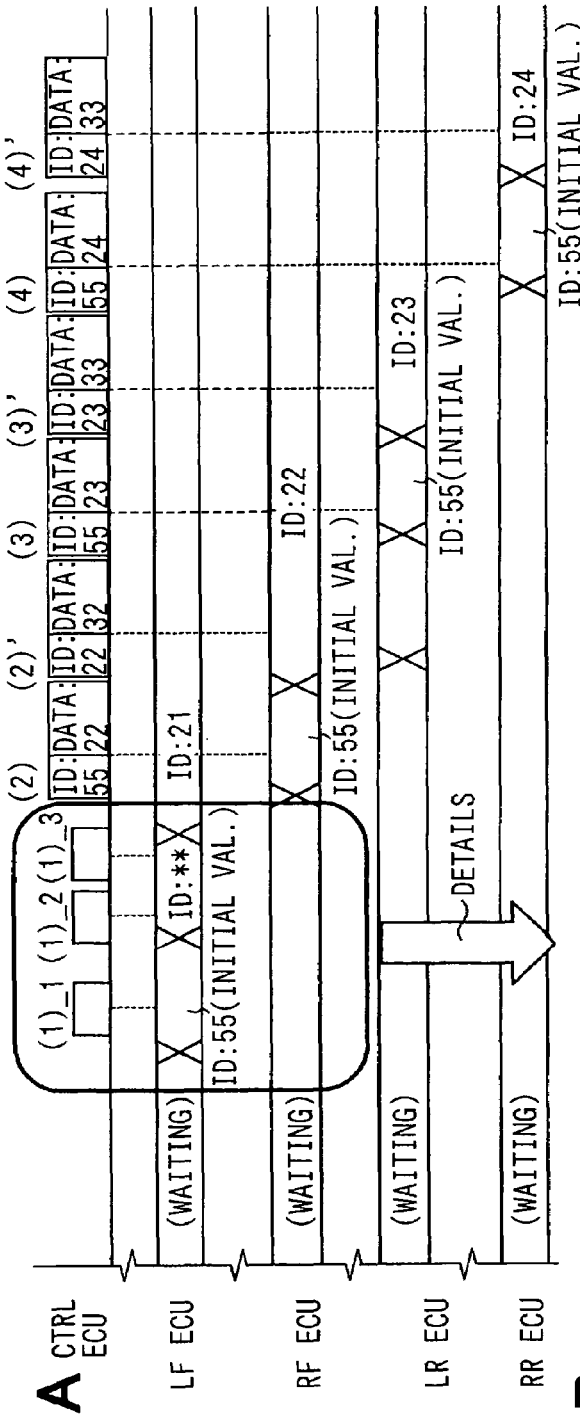
FIGS. 9A-9B are diagrams showing the third embodiment which corresponds to FIG. 4.
Figure 9B:
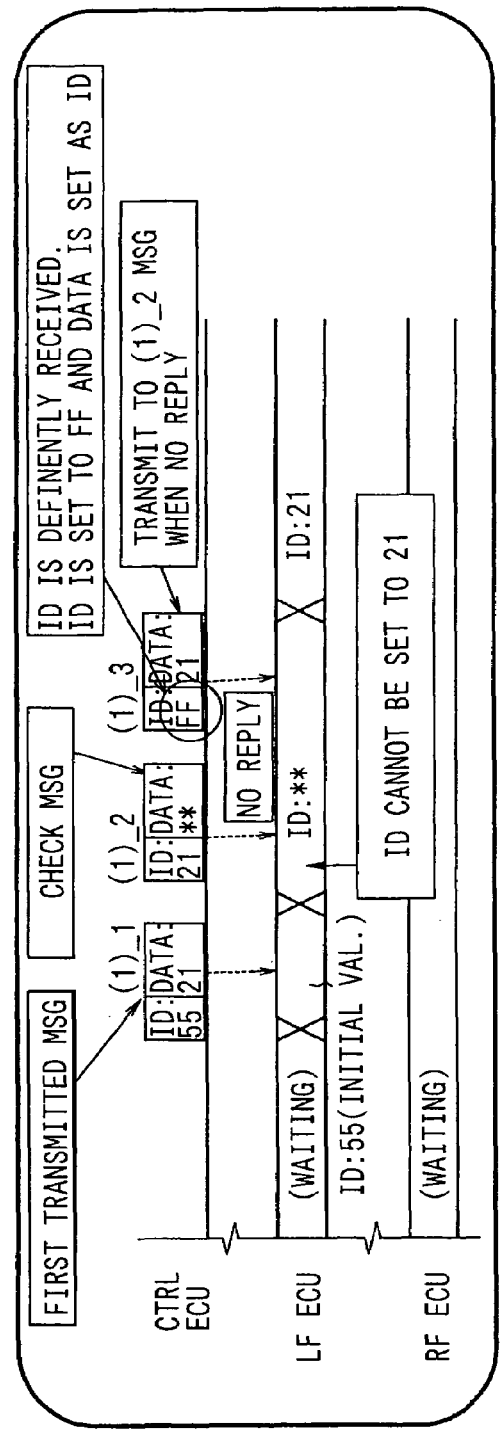

FIGS. 8, 9A and 9B show a third embodiment. Only portions different from the second embodiment will be described. The third embodiment relates to the processing performed by the control ECU 11 when no reception reply is returned from the slave ECU 12 and thus "NO" is judged in the step A5 of the second embodiment.

Accordingly, this embodiment is based on the assumption that when common ID data "FF(HEX)" is transmitted to the ID filter of each slave ECU 12 separately from the ID set in the data register, each slave ECU 12 accepts the reception data packet concerned. That is, a comparator in the ID filter 19 compares the header of the packet thus transmitted with both the set value of the data register and the common ID data "FF" which is fixedly set in advance in a hardware style, and if the header is coincident with any one of the set value and the common ID data "FF", the packet concerned is accepted.

When the control ECU 11 judges "NO" in step A5, the control ECU 11 re-transmits the ID data to be allocated with the common ID data "FF" as a header (step A6, shown specifically FIG. 9B, portion (1)_3). Then, the control ECU 11 shifts to the step A2 to wait for a reception reply to the transmission concerned.

That is, because data is written and set in the data register of the ID filter 19 by hardware logic or CPU 15, an error in the data writing might fail if noise is superposed on the data or the like. On the other hand, the common ID data "FF" which is fixedly set in advance in a hardware style is stabilized in state and thus it is hard to vary, so that the slave side ECU 12 can surely identify the common ID data with high probability. Therefore, when it is judged that the ID setting in step A1 fails, the control ECU 11 re-tries allocation of ID data with the common ID data "FF" as a header in step A6.

As described above, according to the third embodiment, when the common ID data "FF" is fixedly set in each slave ECU 12 in advance, and the control ECU 11 indicates ID to be originally allocated and transmits the ID concerned together with the common ID when no reply to the re-transmission in step A4 is received, each slave ECU 12 sets as its own ID the ID data transmitted together with the common ID. Accordingly, even when ID setting which is tried by the control ECU 11 fails for some reason, the resetting can be tried by using the common ID which is fixedly set in each slave ECU 12 in advance, so that reliability of the system can be enhanced.

Fourth Embodiment

Figure 10:
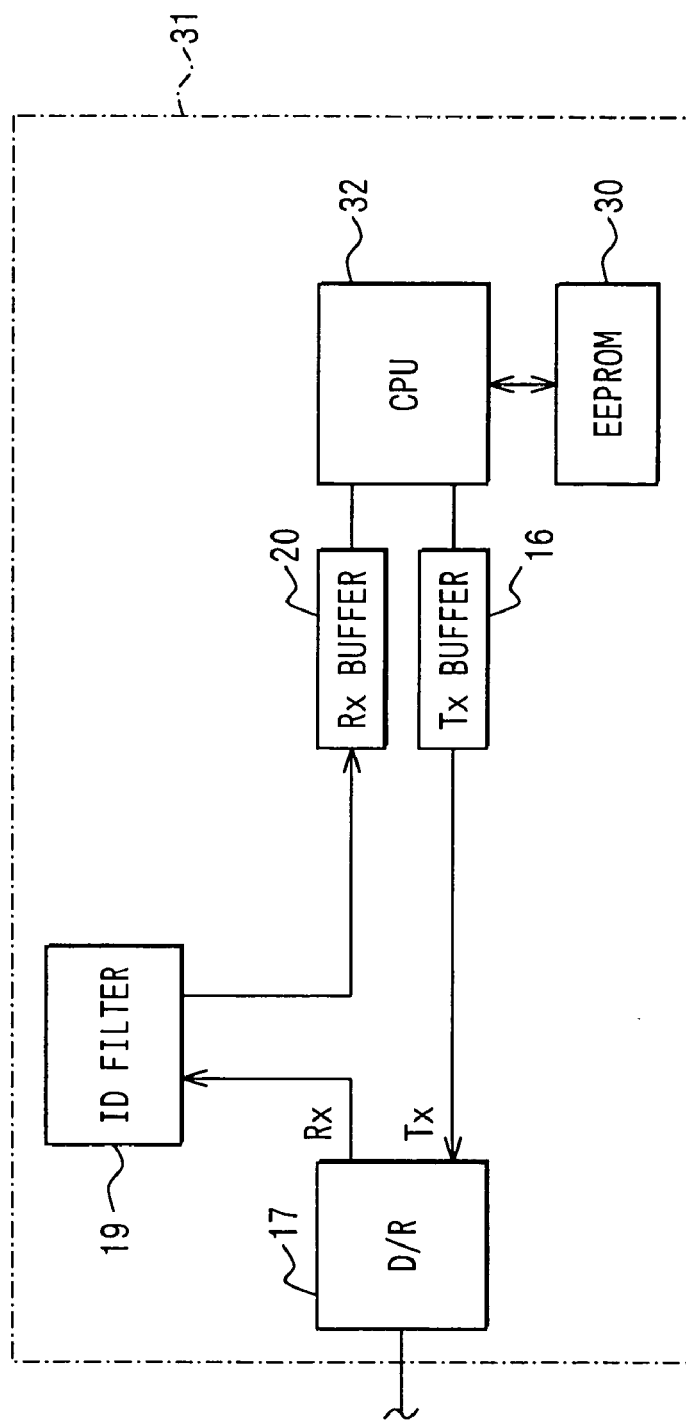
FIG. 10 is a diagram showing a fourth embodiment which corresponds to FIG. 1.

FIGS. 10 to 13 show a fourth embodiment, and only a different portion from the first embodiment will be described. FIG. 10 is a functional block diagram showing the construction of a slave ECU 31. In the slave ECU 31, the A/D converter 27 and the counter 28 are removed from the slave ECU 12, and CPU 32 is equipped in place of CPU 15. Unlike the first to third embodiments, the harness has no ID determining signal line 21, and the voltage dividing resistors 22 and 23 are not disposed in the connector. Furthermore, the slave ECU 31 is equipped with an EEPROM (non-volatile memory) 30 for storing ID data transmitted from the control ECU 11.

Figure 11:
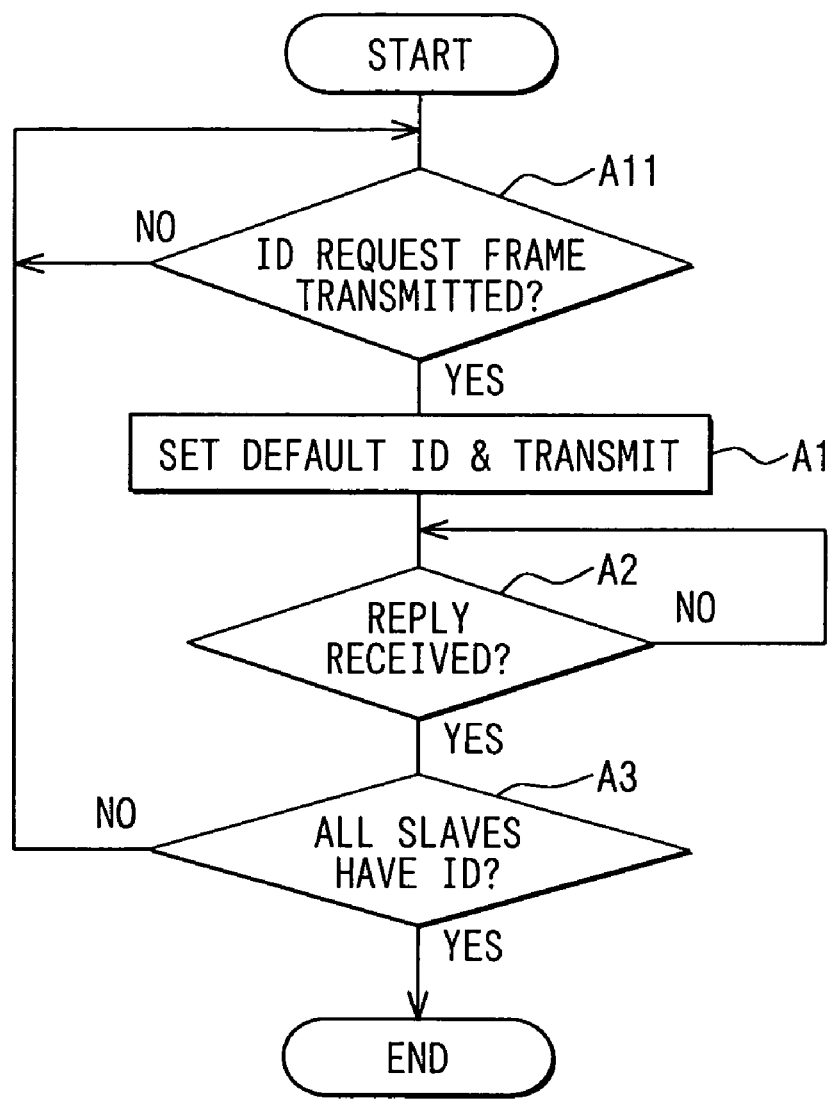
FIG. 11 is a diagram showing the fourth embodiment which corresponds to FIG. 2.
Figure 12:
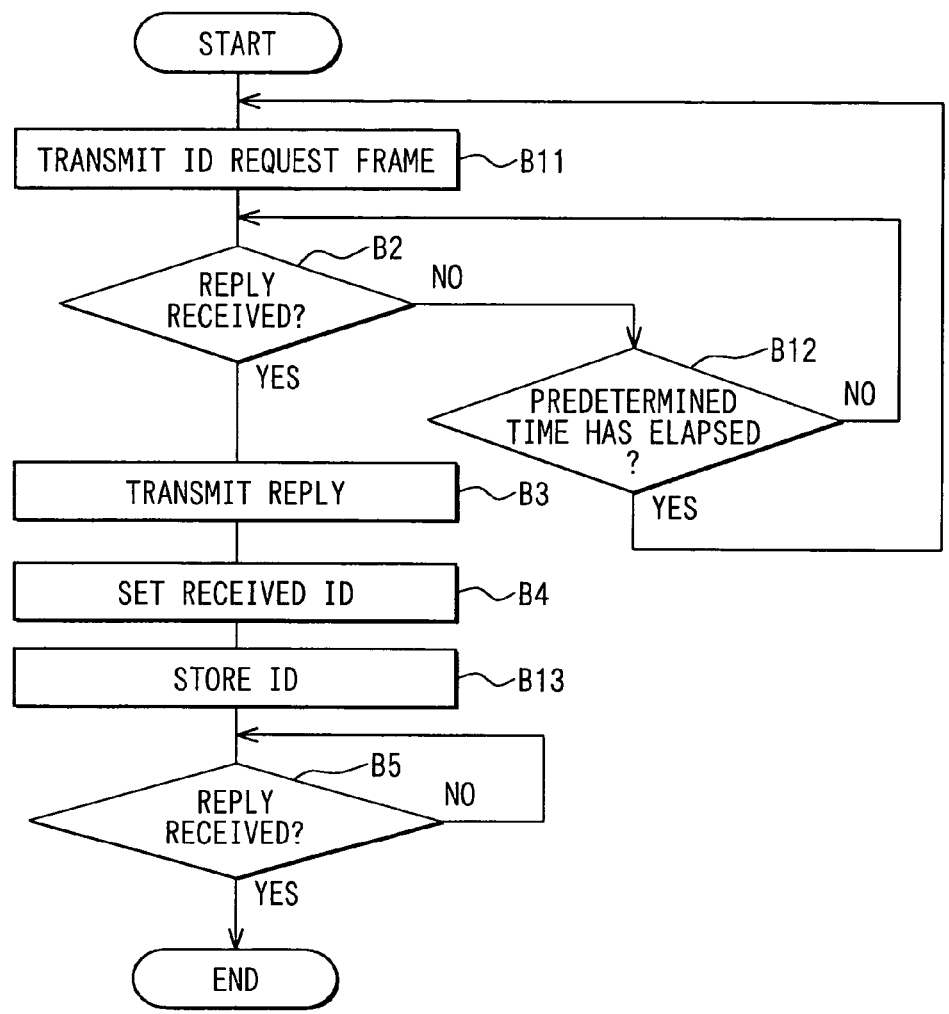
FIG. 12 is a diagram showing the fourth embodiment which corresponds to FIG. 3.

FIGS. 11 and 12 are flowcharts showing the respective control contents of the control ECU 11 and the slave ECU 31. As shown in FIG. 11, the control ECU 11 waits until an "ID request frame" is transmitted from the slave side (step A11). On the other hand, when power is turned on, CPU 32 of the slave ECU 31 is designed to continue- to transmit the "ID transmission request frame" every predetermined time as shown in FIG. 12 (steps B11, B12). Accordingly, when the slave ECU 31 is installed into the communication network 13 under the state that power is turned on in advance, the "ID request frame" is transmitted from the slave ECU 31 to the control ECU 11 side at the time point when the installation is performed.

Figure 13:
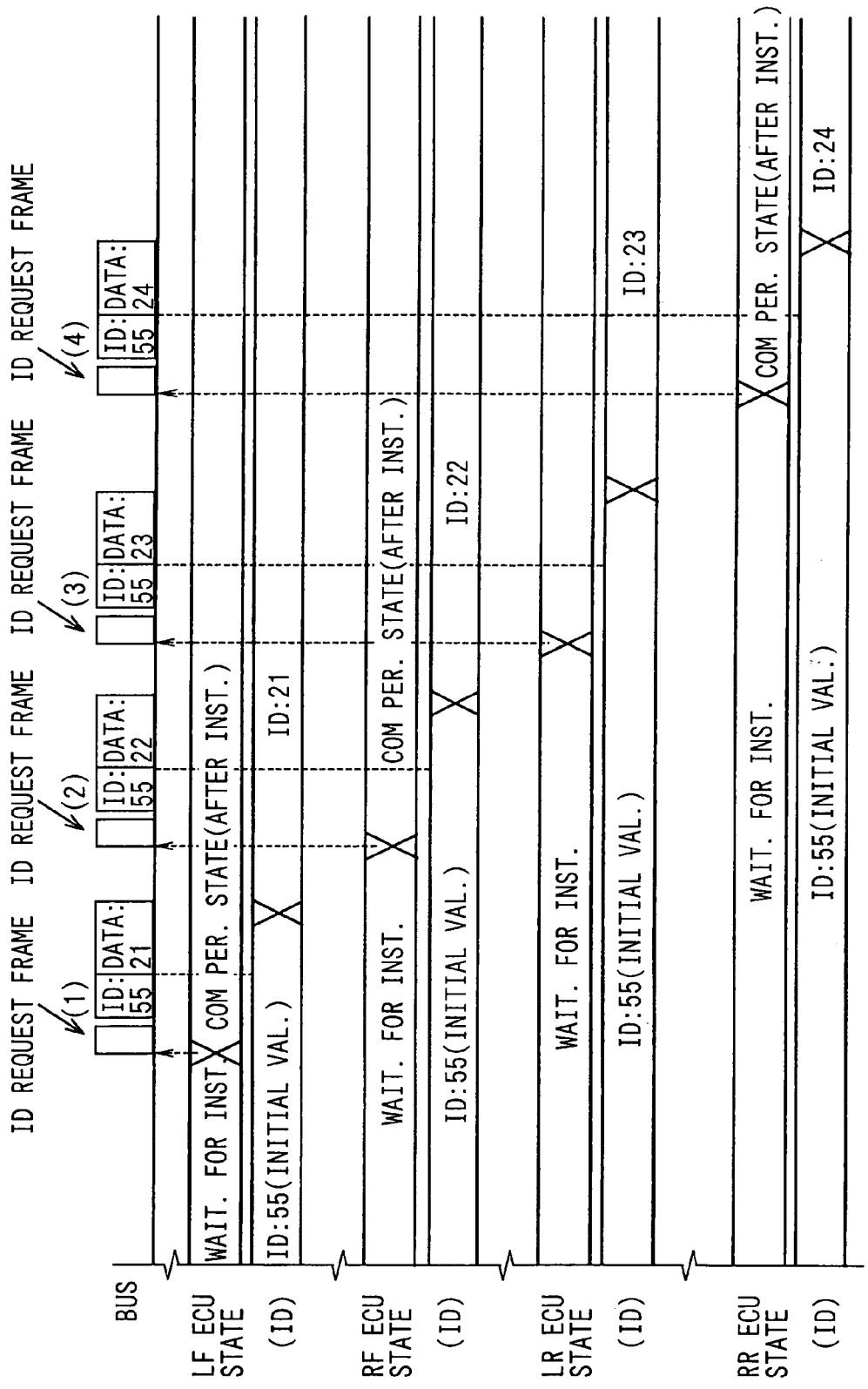
FIG. 13 is a diagram showing the fourth embodiment which corresponds to FIG. 4.

FIG. 13 corresponds to FIG. 4, and shows an example of a communication processing sequence performed between the control ECU 11 and each of the four slave ECUs 31A, 31B, 31C, 31D. In this case, the four slaves ECU 31 are installed to the communication network 13 in the order of A, B, C and D.

First, the slave (LF) ECU 31A to be first connected transmits the "ID request frame" to the control ECU 11. At this time, the control ECU 11 transmits a data packet containing the default ID "55" as a header and ID data "21" to be allocated as a main body in order to set the ID in the slave ECU 31A as in the case of the first embodiment.

As in the case of the first embodiment, the slave ECU 31A waits for reception under the state that the default ID "55" is set in the ID filter 19. When a data packet (1) is transmitted by the control ECU 11, the slave ECU 31A receives the packet concerned, transmits a reception reply to the control ECU 11, and sets ID "21" to the ID filter 19. The slave ECU 31A writes and stores the ID data thus transmitted into EEPROM 30 (step B13).

Subsequently, the slave ECU 31B is installed, and transmits an ID request frame to the control ECU 11. At this time, the control ECU 11 transmits a data packet containing the default ID "55" as a header and the ID data "22" to be allocated as a main body in order to set ID to the slave ECU 31B. The slave ECU 31B receives the data packet thus transmitted, and when it transmits a reception reply to the control ECU 11 as in the case of ECU 31A, it sets the ID "22" into the ID filter 19.

Subsequently, the slave ECU 31C, 31D likewise transmits the "ID request frame" at the time point when each is installed, and each of ID "23", "24" transmitted by the control ECU 11 is set in the ID filter 19.

As described above, according to the fourth embodiment, when it is detected that the slave ECU 31 is connected to the communication network 13, the control ECU 11 transmits ID data to be allocated to the slave ECU 31, and each slave ECU 31 sets the ID data transmitted from the control ECU 11 as its own ID. Accordingly, by successively connecting each slave ECU 31 to the communication network 13, ID is allocated to each slave ECU 31 by the control ECU 11 at the time point when the connection is established, and thus different IDs can be surely allocated to the slave ECUs 31 on the network 13 without increasing the number of signal lines.

When connected to the communication network 13, each slave ECU 31 transmits an ID request to the control ECU 11, and the control ECU 11 receives the ID request to detect that the slave ECU 31 is connected to the communication network 13. Accordingly, the control ECU 11 side is not required to actively perform the connection detecting processing, and the connection can be detected by merely successively connecting each slave ECU 31 to the communication network 13.

Fifth Embodiment

Figure 14:
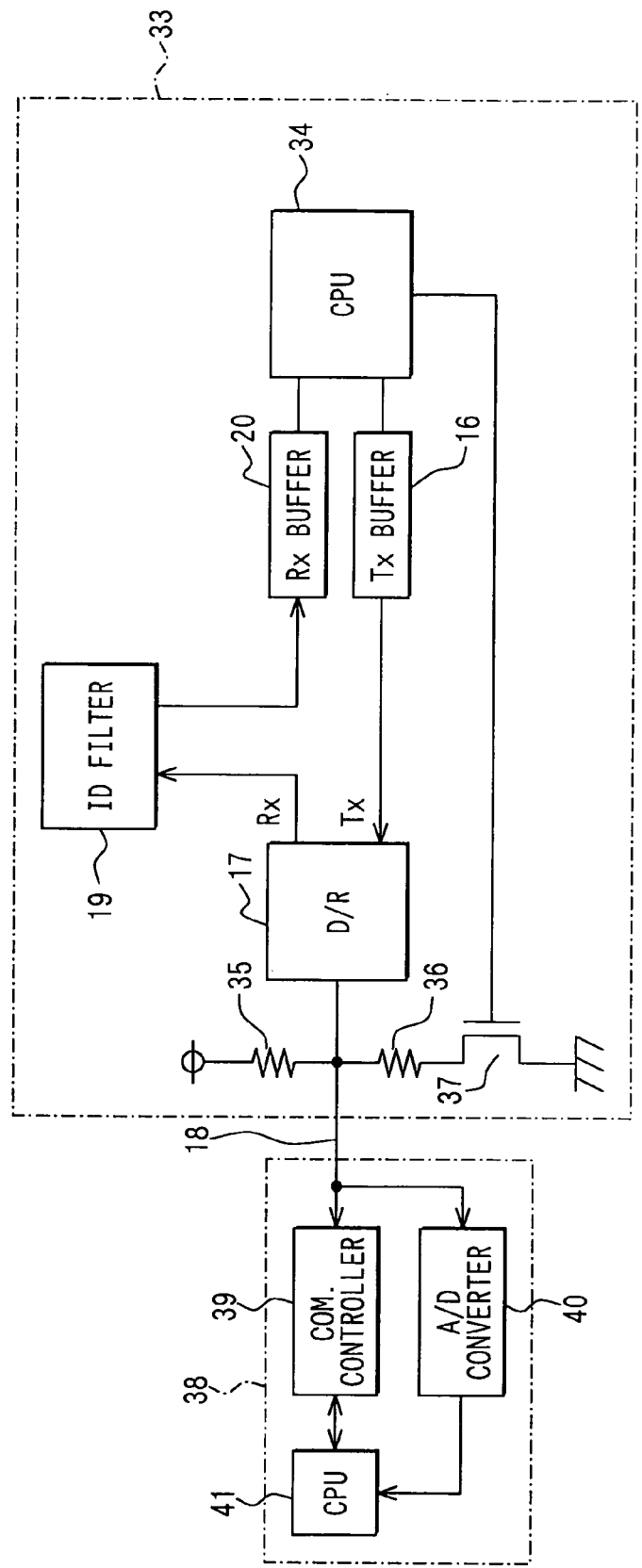
FIG. 14 is a diagram showing a fifth embodiment which corresponds to FIG. 1.

FIGS. 14 to 17 show a fifth embodiment. Only portions different portion from the fourth embodiment will be described. FIG. 14 is a functional block showing the construction of a slave ECU 33 and a control ECU (master) 38. The slave ECU 33 is equipped with a CPU 34 in place of CPU 32 of the slave ECU 31 of the fourth embodiment.

A resistor 35 is connected between the communication bus 18 connected to the transmitting/receiving unit 17 and the power source, and a series circuit comprising a resistor 36 and an N-channel MOSFET 37 is connected between the communication bus (communication signal line) 18 and the ground. These voltage dividing resistance values are selected so that the divided voltage potential is different among the respective slave ECUs 33. CPU 34 outputs a gate signal to the gate of the FET 37 to control on/off of the FET 37.

The control ECU 38 comprises a communication controller 39 and an A/D converter 40 which are connected to the communication bus 18, and CPU 41. The A/D converter 40 is used to read potential variation of the communication bus 18.

Next, the operation of the fifth embodiment will be described with reference to FIGS. 15 to 17. In the flowchart of FIG. 16, CPU 34 of the slave ECU 33 sets FET 37 to an ON-state under an initial state where power is turned on (step B14). Accordingly, when the slave ECU 33 is connected to the communication network 13 under the above state, the potential of the communication bus 18 which is pulled up to 5V under a normal state is set to the divided voltage potential of the resistors 35 and 36. For example, when the resistance value of the resistor 35 is equal to 30 kΩ and the resistance value of the resistor 36 is equal to 70 kΩ, the divided voltage is equal to 3.5V.

Figure 15:
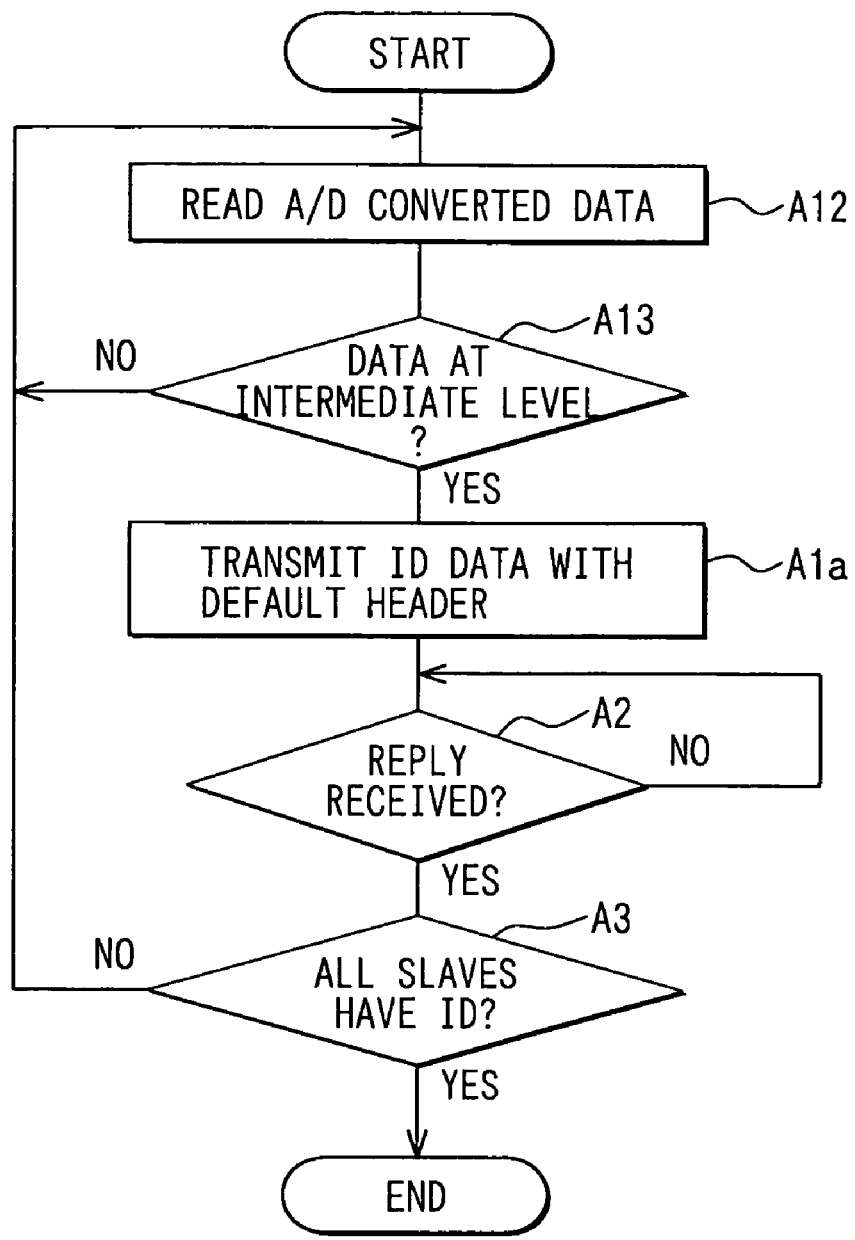
FIG. 15 is a diagram showing the fifth embodiment which corresponds to FIG. 2.
Figure 16:
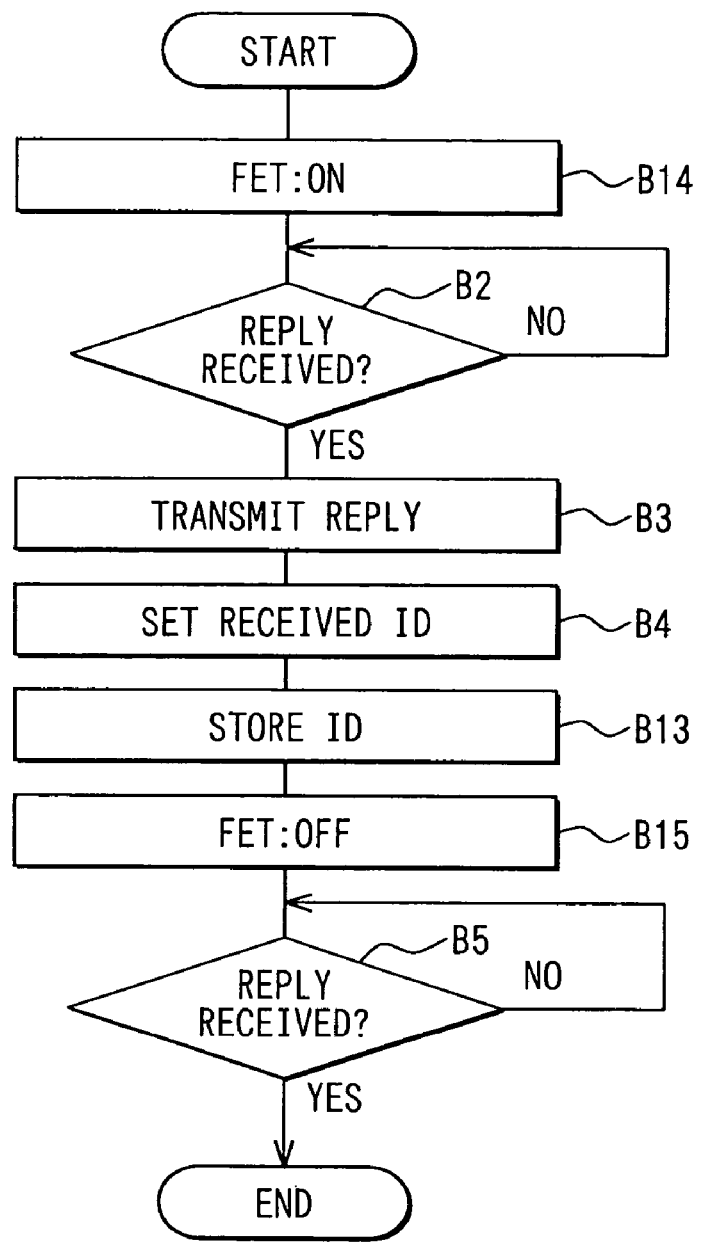
FIG. 16 is a diagram showing the fifth embodiment which corresponds to FIG. 3.

In FIG. 15, when activated, CPU 41 of the control ECU 38 reads in the potential data of the communication bus 18 which is converted by the A/D converter 40 (step A12), and it is judged whether the potential is an intermediate level or not (step A13). The "intermediate level" refers to the divided voltage potential set by the voltage dividing resistors at the slave ECU 33 side as described above. For example, this potential is the potential ranging from 0 to 5V which is clearly recognized as being different from the normal power source voltage of 5V, and the potential level is selected so that the communications can be performed between the control ECU 38 and the slave ECU 33 through the communication bus.

When judging that the potential data of the communication bus 18 is set to an intermediate level (step A13, "YES"), CPU 41 transmits ID data associated with each intermediate level in advance with the default ID as a header (step A1a).

Returning to FIG. 16 again, when ID data is transmitted from the control ECU 38 (step B2, "YES"), CPU 34 of the slave ECU 33 executes the steps B3, B4, B13 and then turns off FET 36 (step B15) as in the case of the fourth embodiment. At this time, the communication bus 18 is pulled up to 5V by the resistor 35, so that the voltage level thereof is returned to the voltage level under the normal state.

Figure 17:
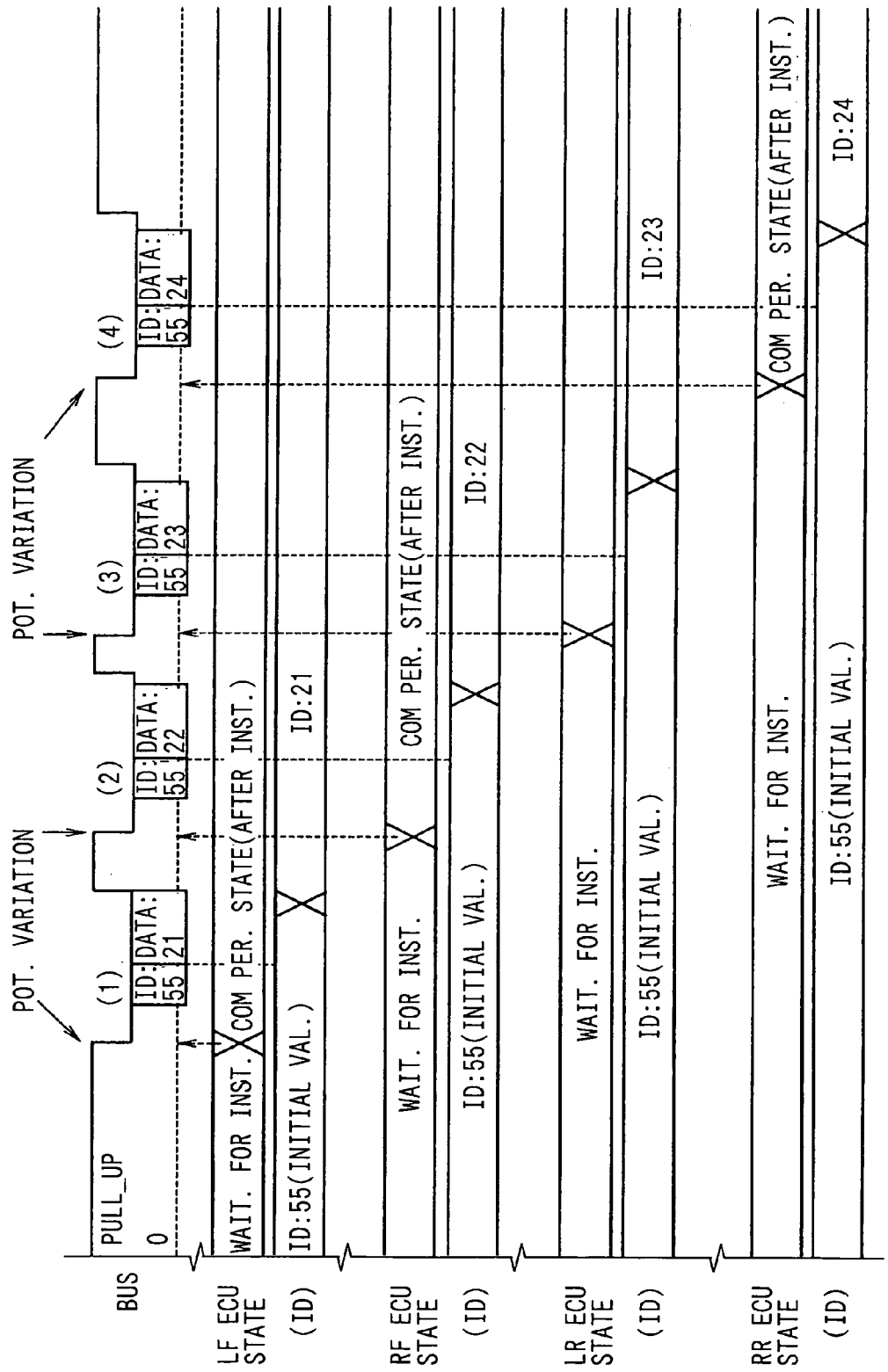
FIG. 17 is a diagram showing the fifth embodiment which corresponds to FIG. 4.
Figure 18:
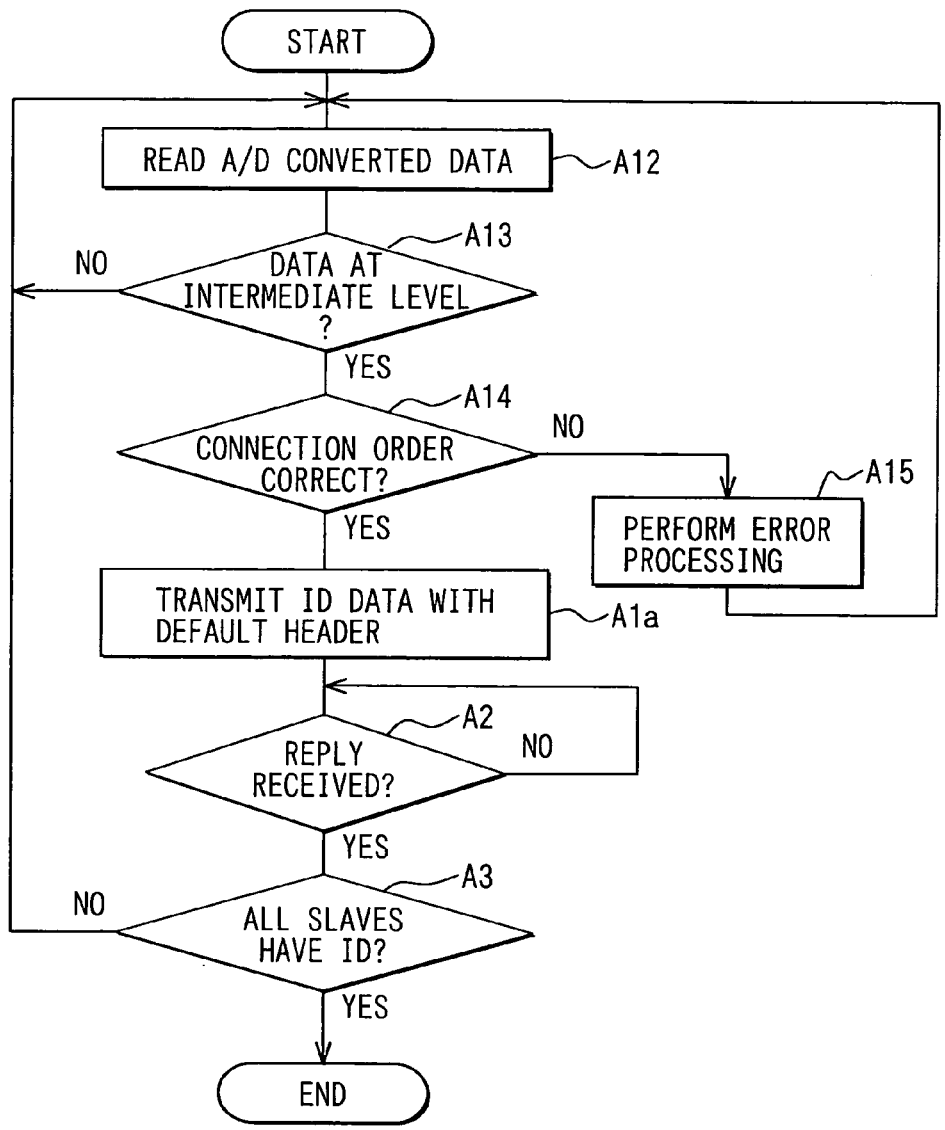
FIG. 18 is a diagram showing a sixth embodiment which corresponds to FIG. 15.

The above processing is performed by each slave ECU 33 as shown in FIG. 17. For convenience of illustration, the intermediate level of the communication bus 18 which is set by each slave ECU 33 is illustrated as being identical among the respective slave ECUs 33. Actually, for example when the control ECU 38 side uses an A/D converter 40 of 10 bits, the intermediate levels of the respective slave ECU 33 can be sufficiently discriminated from one another by providing a difference of about 0.1V (about 20LSB).

As described above, according to the fifth embodiment, each slave ECU 33 varies the potential of the communication bus 18 connected to the communication network 13 from the initial state to the intermediate level, and the control ECU 38 recognizes the potential variation concerned to detect that the slave ECU 33 is connected to the communication network 13. When each slave ECU 33 sets the ID data transmitted from the control ECU 38 as its own ID, the slave ECU 33 returns the potential of the communication bus 18 to the initial state. Accordingly, as in the case of the fourth embodiment, different IDs can be surely allocated to the respective slave ECUs 33 on the network 13 without increasing the number of communication signal lines.

Furthermore, each slave ECU 33 varies the potential of the communication bus 18 thereof to the intermediate level which is different among the respective slave ECUs 33, and the control ECU 38 reads the potential variation level to transmit the ID data to be allocated to each slave ECU 33. Therefore, when ID to be allocated to each slave ECU 33 is predetermined, the control ECU 38 can allocate ID while checking the association between each slave ECU 33 and ID to be allocated thereto.

Sixth Embodiment

FIGS. 18 and 19A-19C show a sixth embodiment. Only a portion different from the fifth embodiment will be described. The basic construction of the sixth embodiment is the same as the fifth embodiment. However, the processing at the control ECU 38 side is different. That is, in the flowchart of FIG. 18, when judging "YES" in step A13, CPU 41 of the control ECU 38 judges whether the connection order of the slave ECU 33 is right or not (step A14).

If the connection order is right ("YES"), the processing of CPU 41 shifts to step A1a. On the other hand, if the connection order is not right ("NO"), the control ECU 38 carries out error processing for informing that the connection order is wrong (step A15), and then the processing thereof shifts to step A12. The error processing is performed by displaying an error message on display means such as a display or the like which is connected to the control ECU 38 (when the display control of an instrument panel of a vehicle is allowed to be controlled in display, the error processing may be performed by using the display of the instrument panel).

Figure 19C:
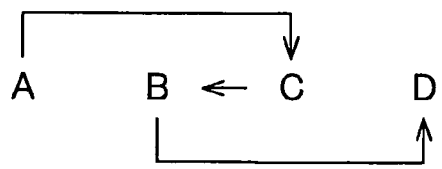

That is, as shown in FIG. 19A, it is assumed that the four slave ECUs 33 are set to be connected to the left front side, the right front side, the left rear side and the right rear side of a vehicle in the connector order of A' B' C' D. Accordingly, on the basis of the intermediate voltage level of the communication bus 18 set by each slave ECU 33, it is judged whether the connection order is right or not. FIG. 19B shows a case where the connector order is incorrect, that is, shows a case where the slave ECU 33(C) is connected prior to the slave ECU 33(B) at the position at which the slave ECU 33(B) should be originally located. FIG. 19C shows a case where the connection position of each slave ECU 33 is right, however, the slave ECU 33(C) is connected prior to the slave ECU 33(B). Since the control ECU 38 side cannot judge that the case of FIG. 19C is right, it carries out the processing as an error at the time point when the slave ECU 33(C) is precedently connected.

According to the sixth embodiment described above, the control ECU 38 reads the potential variation level of the communication bus 18 set by each slave ECU 33 to judge whether the connection order of each slave ECU 33 is proper or not. Therefore, when it is required to associate the connection order of each slave ECU 33 with ID to be allocated thereto, the control ECU 38 can allocate the ID while checking the association relationship.

Seventh Embodiment

Figure 20:
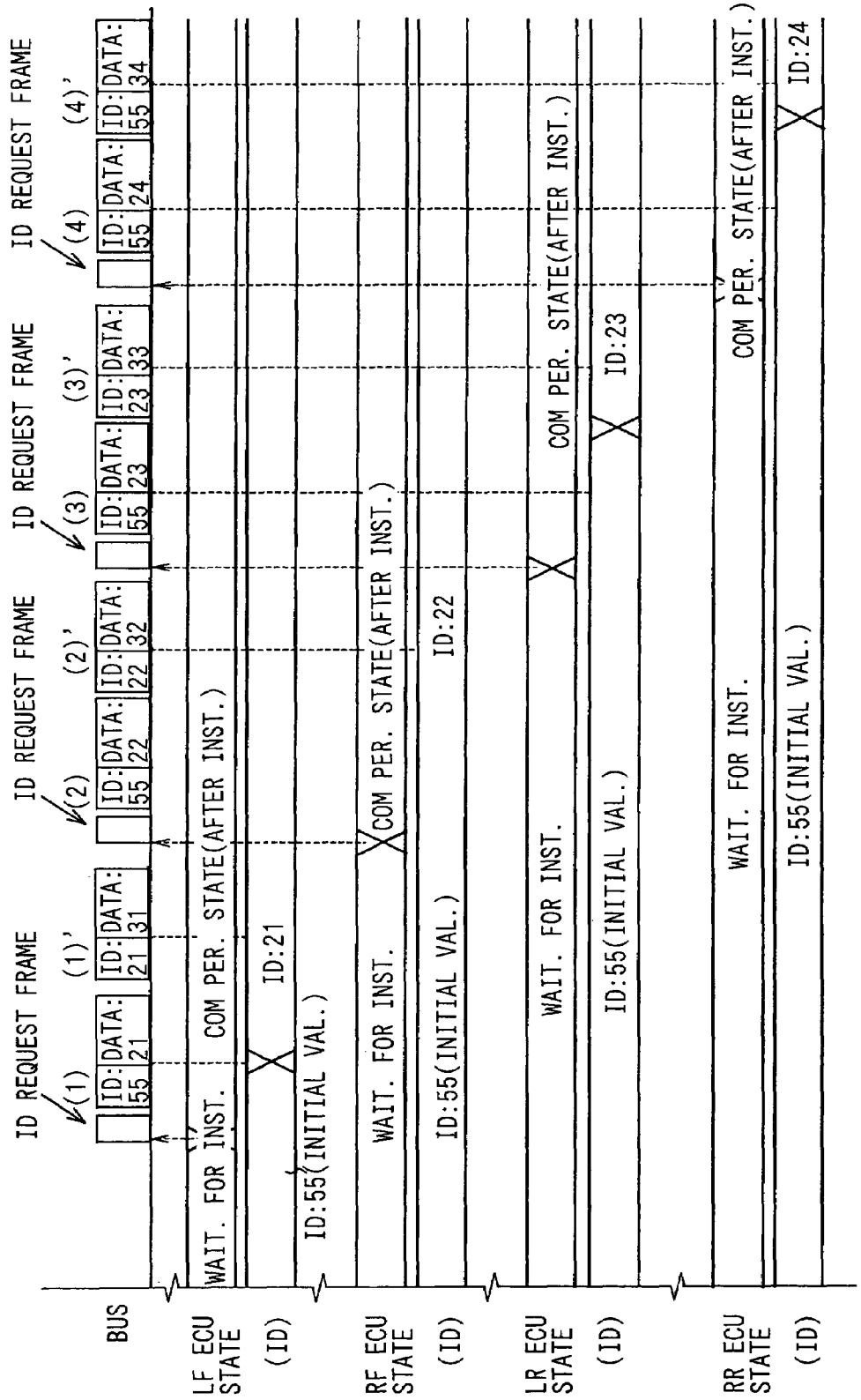
FIG. 20 is a diagram showing a seventh embodiment which corresponds to FIG. 7.

FIG. 20 shows a seventh embodiment, and only a different portion from the fourth embodiment will be described. The seventh embodiment relates to the control based on the combination of the second and fourth embodiments. That is, when there is a reception response from the slave ECU 31 side in step A2 ("YES"), the control ECU 11 transmits dummy data "31" to the slave ECU 31 with ID allocated in step A1 as a header. If a reception reply to the transmission is returned, the processing shifts to step A3. On the other hand, if no reception reply is returned within a predetermined time, the processing shifts to step A11 and waits for transmission of an ID request frame again. In this case, the processing is performed so that the same ID is allocated again.

As described above, according to the seventh embodiment, by combining the control of the fourth embodiment with the control of the second embodiment, the actions and effects of both the embodiments can be achieved at the same time.

Eighth Embodiment

FIG. 21A-21B show an eighth embodiment. Only a portion different from the fourth embodiment will be described. The eighth embodiment relates to the control based on the combination of the third and fourth embodiments. That is, when judging "NO" (no reply is received from the slave) in step A5, the control ECU 11 transmits ID data to be allocated again with the common ID data "FF" as a header (see FIG. 21B). The processing shifts to step A2 and waits for a reception reply to the transmission concerned.

As described above, according to the eighth embodiment, by combining the control of the fourth embodiment with the control of the third embodiment, the actions and effects of both the embodiments can be achieved at the same time.

Ninth Embodiment

Figure 22:
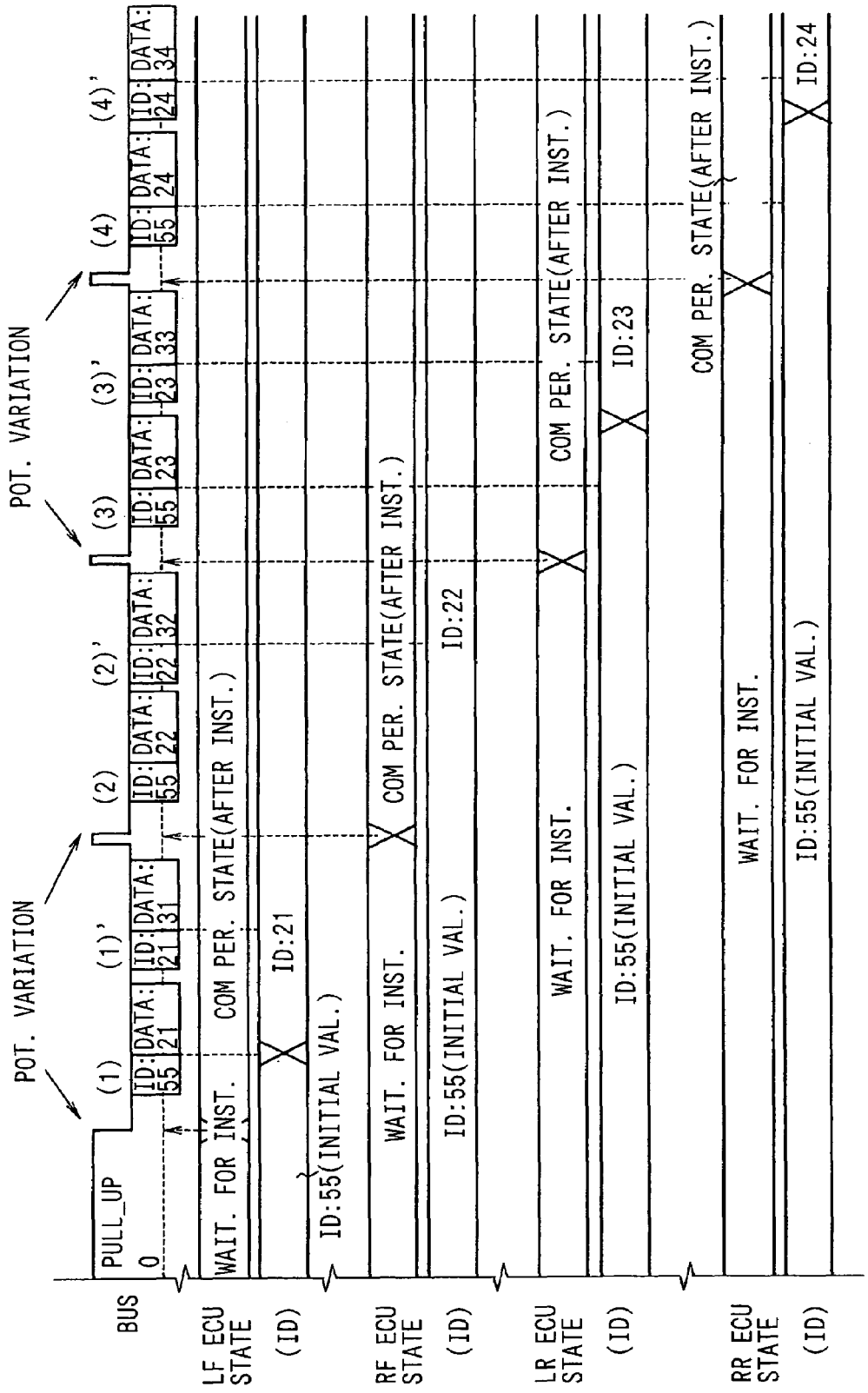
FIG. 22 is a diagram showing a ninth embodiment which corresponds to FIG. 7.

FIG. 22 shows a ninth embodiment. Only a portion different from the fifth embodiment will be described. The ninth embodiment relates to the control based on the combination of the second and fifth embodiments. That is, when there is a reception reply from the slave ECU 33 side in step A2 ("YES"), the control ECU 38 transmits dummy data "31" to the slave ECU 33 with the ID allocated in step A1 as a header. When a reception reply to the transmission is returned, the processing shifts to step A3. On the other hand, if no reception reply is returned within a predetermined period, the processing shifts to step A12 to read A/D-converted data again.

CPU 34 of the slave ECU 33 returns a reception reply to the control ECU 38 side and then turns off FET 36 so that the communication bus 18 is pulled up to 5V by the resistor 35.

As described above, according to the ninth embodiment, by combining the control of the fifth embodiment with the control of the second embodiment, the actions and effects of both the second and fifth embodiments can be achieved at the same time.

Tenth Embodiment

Figure 23A:
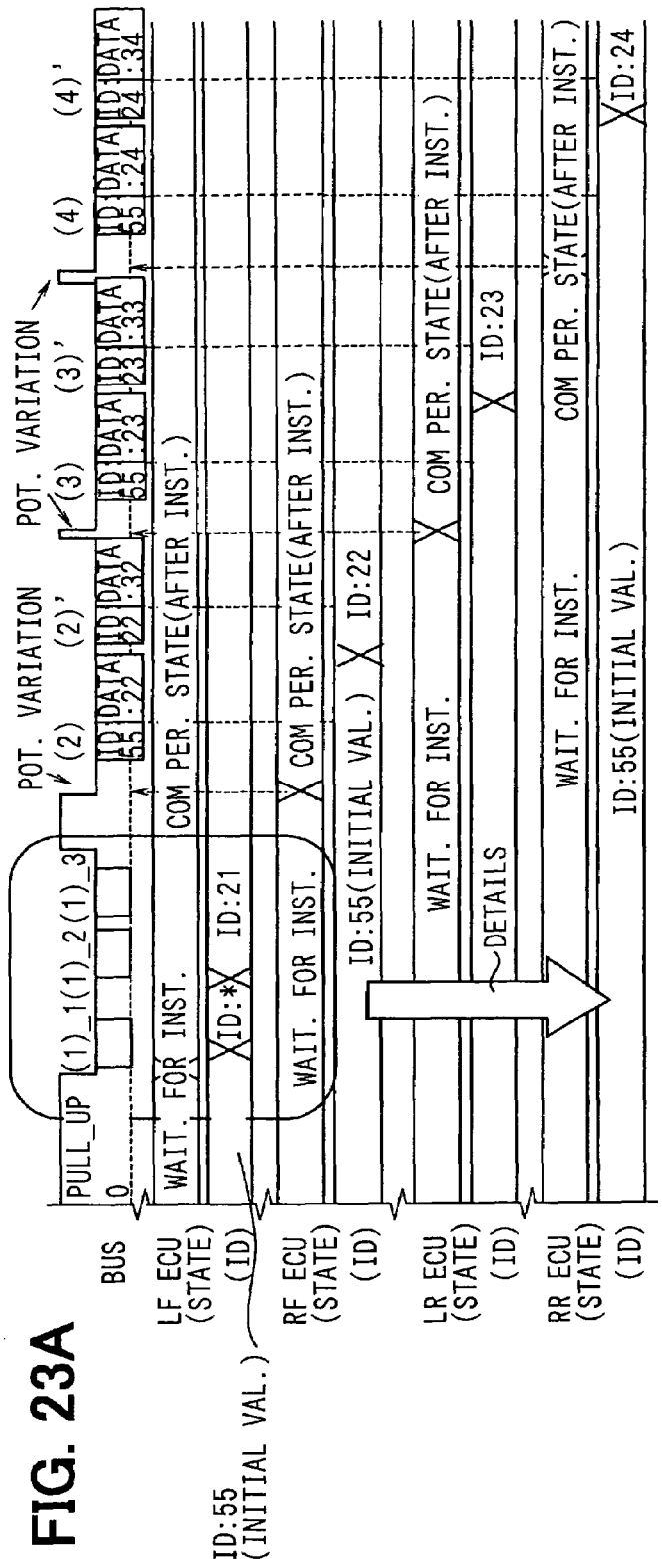
FIGS. 23A-23B are diagrams showing a tenth embodiment which corresponds to FIGS. 9A-9B.
Figure 23B:
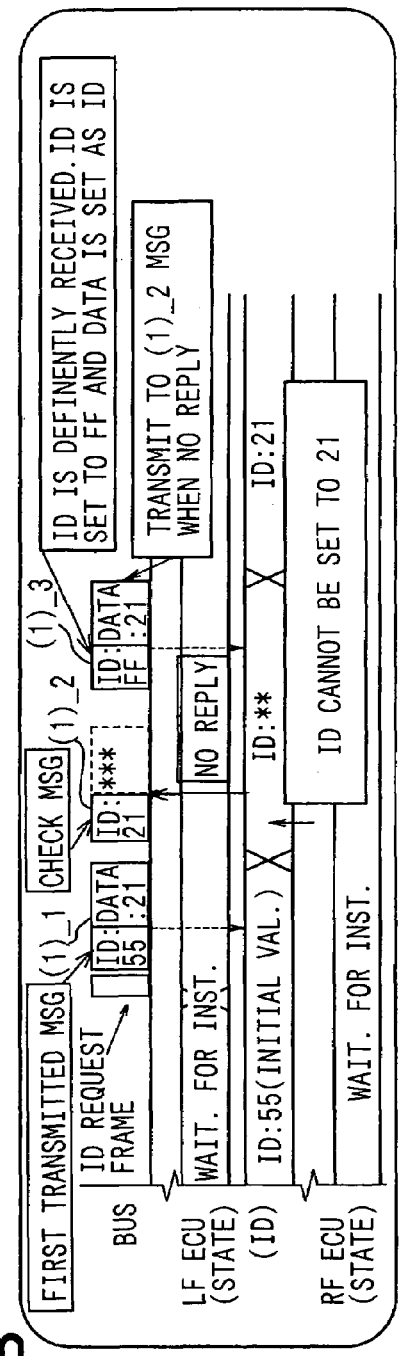

FIGS. 23A-23B show a tenth embodiment. Only a portion different from the fifth embodiment will be described. The tenth embodiment relates to the control based on the combination of the third and fifth embodiments. That is, when judging "NO" in step A5, the control ECU 38 transmits the ID data to be allocated with the common ID data "FF" as a header again (see FIG. 23B). Then, the control ECU 38 shifts to the step A2 and waits for a reception reply to the transmission concerned.

In this case, CPU 34 of the slave ECU 33 returns a reception reply to the control ECU 38 side and then turns off FET 36, so that the bus communication 18 is pulled up to 5V by the resistor 35.

As described above, according to the tenth embodiment, by combining the control of the fifth embodiment with the control of the third embodiment, the actions and effects of both the third and fifth embodiments can be achieved at the same time.

Eleventh Embodiment

Figure 24:
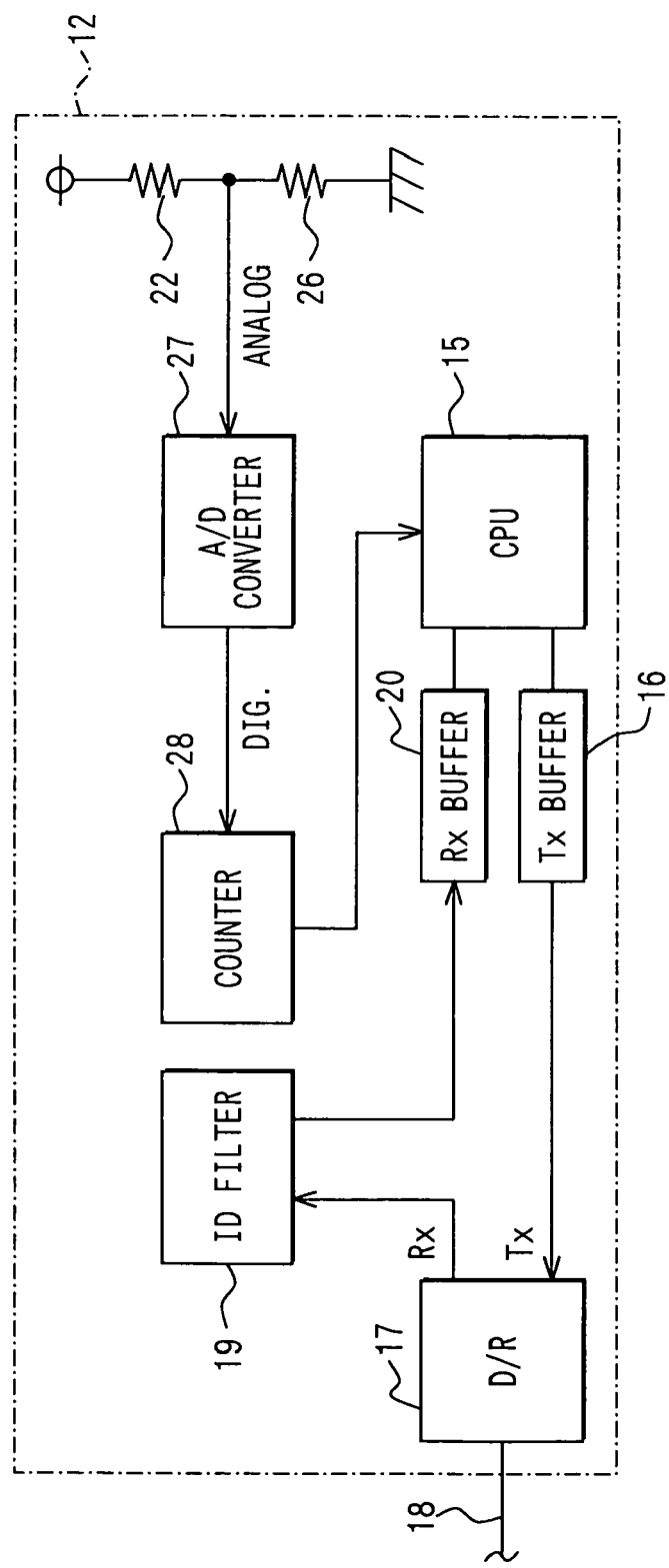
FIG. 24 is a diagram showing an eleventh embodiment which corresponds to FIG. 1.

FIG. 24 shows an eleventh embodiment, and only a different portion from the first embodiment will be described. In the eleventh embodiment, the voltage dividing resistors 22, 26 connected to the ID determining signal line 21 in the connector 24 of the first embodiment are arranged in the slave ECU 12A. That is, the divided voltage potential based on the voltage dividing resistors 22, 26 is supplied to the input port of the A/D converter 27.

When power supply to the slave ECU 12 side is started, the A/D converter 27 automatically A/D-converts the divided voltage potential and the A/D-converted data is set in a wait time setting counter 28. The subsequent processing is the same as the first embodiment.

According to the eleventh embodiment thus constructed, by merely setting the resistors 22, 26 so that different divided voltage potentials are allocated to slave ECUs 12 having the same part number which are designed in the same construction, different IDs can be also allocated by the control ECU 11.

The present invention is not limited to the above embodiments described above with reference to the drawings, and the following modifications and expansions can be made.

For example, the time for which the CPU 15 is continued to be reset from the time point at which the power of the slave ECU 12 is turned on may be set as a wait time, and in this case, CPU 15 may start the processing of the step B2 from the time point at which the resetting is released.

The processing of the steps B01 to B03 may be performed through CPU 15. Likewise, setting of default ID may be performed as the initialization processing by CPU 15.

In the first embodiment, in the case where no reception reply is returned even when a predetermined time elapses in step A2, the processing returns to step A1 to perform ID setting again.

Furthermore, in the first embodiment, it is not required to return a reception reply from the slave ECU 12, and the control ECU 11 may perform the setting and transmission to the next slave ECU 12 after a predetermined time elapses.

The fourth embodiment may be modified so that the same voltage is set to all the slave ECUs 33, and the master ECU 31 side judges only that the voltage of the communication bus 18 is equal to the intermediate level and allocates IDs in the connection order.

The sixth embodiment may be combined with each of the second and third embodiments.

The present invention is not limited to the communication network system based on ECUs for a vehicle, and it may be applied to any communication network system insofar as one master and plural slaves exist and it is required to allocate ID to each slave under the state that the master and the slaves are connected to the communication network system.

What is claimed is:

1. A network system comprising a master and two or more slaves connected to a communication network, wherein when detecting that a slave is connected to the communication network, the master transmits ID data to be allocated to the slave, and each slave sets a respective slave ID with the ID data transmitted from the master and wherein when connected to the communication network, the each slave varies a potential of a communication signal line from an initial state to an intermediate level so as to allow data communication, the master recognizes the potential variation of the communication signal line to thereby detect the connection of the slave to the communication network, and each slave returns the potential of the communication signal line to said initial state after setting the respective slave ID with the ID data transmitted from the master.

2. The network system according to claim 1, wherein the each slave transmits an ID request to the master when connected to the communication network, and the master detects the connection of the slave to the communication network by receiving the ID request.

3. The network system according to claim 2, wherein the each slave periodically outputs the ID request when power is turned on, and stops the output of the ID request when the ID data is transmitted from the master.

4. The network system according to claim 1, wherein the each slave varies the potential of the communication signal line to the intermediate level, the intermediate level being different for every one of the two or more slaves, and the master reads the intermediate level of the communication signal line to transmit the ID data corresponding to each of the respective intermediate levels to the corresponding one of the two or more slaves.

5. The network system according to claim 1, wherein the each slave varies the potential of the communication signal line to the intermediate level, the intermediate level being different for every one of the two or more slaves, and the master reads the intermediate level of the communication signal line to judge whether the connection order of the each slave is proper or not.

6. The network system according to claim 1, wherein, each slave returns a reply to the master when setting the respective slave ID with the ID data transmitted from the master, wherein the master indicates the ID data to be allocated to each slave and re-transmits the ID data thus indicated, and checks whether a reply to the transmission is returned or not upon reception of the reply from each slave.

7. The network system according to claim 6, wherein a common ID is fixedly set in the each slave in advance in addition to the respective slave ID, the master indicates and transmits the ID data to be originally allocated together with the common ID when receiving no reply to the re-transmission, and the each slave sets as the respective slave ID the ID data transmitted together with the common ID.

8. A network system comprising a master and two or more slaves connected to a communication network, wherein each slave is equipped with a connection terminal and potential setting means for setting a respective potential associated with the connection terminal when power is turned on, the respective potential different for the each slave of the two or more slaves, and the each slave reads the respective potential when activated while connected to the communication network, and sets a respective slave ID for the each slave corresponding to the respective potential and wherein when connected to the communication network, the each slave varies a potential of a communication signal line from an initial state to an intermediate level so as to allow data communication, the master recognizes the potential variation of the communication signal line to thereby detect the connection of the slave to the communication network, and each slave returns the potential of the communication signal line to said initial state after setting the respective slave ID with the ID data transmitted from the master.

9. A method of allocating a respective slave ID in a network system comprising a master and two or more slaves connected to a communication network, the method comprising:
transmitting, from the master, ID data to be allocated to each of the two or more slaves when detecting that the each slave is connected to the communication network, and setting as the respective slave ID in the each slave the ID data transmitted from the master and wherein the each slave varies a potential of a communication signal line from an initial state to an intermediate level at which data communication can be performed when connected to the communication network, the master recognizes the connection of the each slave to the communication network by recognizing the intermediate level of the potential variation of the communication signal line, and the each slave returns the potential of the communication signal line to the initial state after setting the respective slave ID with the ID data transmitted from the master.

10. The ID allocating method for the network system according to claim 9, further comprising: transmitting from the each slave an ID request to the master when connected to the communication network, and detecting, at the master, on the basis of reception of the ID request, that the each slave is connected to the communication network.

11. The ID allocation method for the network system according to claim 10, wherein the each slave periodically outputs the ID request when power thereto is turned on, and stops the output of the ID request when the ID data is transmitted from the master.

12. The ID allocating method for the network system according to claim 9, wherein the each slave varies the potential of the communication signal line to a respective different intermediate level, and the master reads the respective different intermediate level of the potential variation of the communication signal line and transmits the ID data corresponding to the each slave based on the respective different intermediate level.

13. The ID allocating method for the network system according to claim 9, wherein the each slave varies the potential of the communication signal line to a respective different intermediate level, and the master reads the respective different intermediate level of the potential variation level of the communication signal line to judge whether the connection order of the each slave is proper or not.

14. The ID allocating method for the network system according to claim 9, wherein the each slave returns a reply to the master when setting the respective slave ID with the ID data transmitted from the master, and upon reception of the reply from the each slave the master indicates and re-transmits the ID data allocated to the each slave, and checks whether the reply to the transmission is returned or not.

15. The ID allocating method for the network system according to claim 14, wherein a common ID is fixedly set in the each slave in advance in addition to the respective slave ID, the master indicates and transmits the ID data to be originally allocated together with the common ID when receiving no reply to the re-transmission, and the each slave sets the respective slave ID with the ID data transmitted together with the common ID.

* * * * *